United States Patent
Maeda

(10) Patent No.: US 9,288,463 B2
(45) Date of Patent: Mar. 15, 2016

(54) INTERESTING SECTION IDENTIFICATION DEVICE, INTERESTING SECTION IDENTIFICATION METHOD, AND INTERESTING SECTION IDENTIFICATION PROGRAM

(71) Applicant: PANASONIC INTELLECTUAL PROPERTY CORPORATION OF AMERICA, Torrance, CA (US)

(72) Inventor: Kazuhiko Maeda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 434 days.

(21) Appl. No.: 13/824,692

(22) PCT Filed: Oct. 19, 2012

(86) PCT No.: PCT/JP2012/006717
§ 371 (c)(1),
(2) Date: Mar. 18, 2013

(87) PCT Pub. No.: WO2013/124923
PCT Pub. Date: Aug. 29, 2013

(65) Prior Publication Data
US 2014/0072279 A1    Mar. 13, 2014

(30) Foreign Application Priority Data
Feb. 23, 2012  (JP) .................. 2012-037462

(51) Int. Cl.
*H04N 9/87* (2006.01)
*H04N 5/14* (2006.01)
(Continued)

(52) U.S. Cl.
CPC .............. *H04N 9/87* (2013.01); *G06K 9/00751* (2013.01); *G06K 9/3241* (2013.01);
(Continued)

(58) Field of Classification Search
CPC ......... G11B 27/105; G11B 27/34; H04N 5/85
USPC .................................. 386/239, 241, 248, 278
See application file for complete search history.

(56) References Cited

U.S. PATENT DOCUMENTS

2003/0063798 A1* 4/2003 Li ....................... G06F 17/3061
382/165
2007/0013791 A1 1/2007 Kinoshita et al.
(Continued)

FOREIGN PATENT DOCUMENTS

JP          61-199178       9/1986
JP          2006-19387      1/2006
(Continued)

OTHER PUBLICATIONS

International Search Report issued Nov. 27, 2012 in International (PCT) Application No. PCT/JP2012/006717.

*Primary Examiner* — Thai Tran
*Assistant Examiner* — Mishawn Hunter
(74) *Attorney, Agent, or Firm* — Wenderoth, Lind & Ponack, L.L.P.

(57) ABSTRACT

An interesting section identification device includes an object detection unit that detect an object included in a frame extracted from a video, a motion feature value extraction unit that calculates a motion feature value of the object, a distinctiveness calculation unit that calculates a degree of distinctiveness in terms of motion of the object with respect to the frame, and an interesting section identification unit that identifies an interesting section in the video with use of respective calculated degrees of distinctiveness of successive frames.

20 Claims, 14 Drawing Sheets

(51) Int. Cl.
*H04N 21/44* (2011.01)
*G06K 9/32* (2006.01)
*G11B 27/10* (2006.01)
*G11B 27/28* (2006.01)
*H04N 21/845* (2011.01)
*H04N 21/8549* (2011.01)
*G06K 9/00* (2006.01)
*G06T 7/20* (2006.01)

(52) U.S. Cl.
CPC ............ *G06T 7/2033* (2013.01); *G06T 7/2066* (2013.01); *G11B 27/105* (2013.01); *G11B 27/28* (2013.01); *H04N 5/145* (2013.01); *H04N 21/44008* (2013.01); *H04N 21/8456* (2013.01); *H04N 21/8549* (2013.01); *G06T 2207/10016* (2013.01); *G06T 2207/30196* (2013.01); *G11B 2220/2541* (2013.01); *G11B 2220/2562* (2013.01)

(56) References Cited

U.S. PATENT DOCUMENTS

| | | | |
|---|---|---|---|
| 2010/0150403 A1* | 6/2010 | Cavallaro | G06K 9/00778 382/107 |
| 2010/0245394 A1* | 9/2010 | Yokono | G06T 7/2066 345/660 |

FOREIGN PATENT DOCUMENTS

| | | |
|---|---|---|
| JP | 2007-42072 | 2/2007 |
| JP | 2010-128947 | 6/2010 |
| JP | 2011-175599 | 9/2011 |
| JP | 2012-10133 | 1/2012 |

* cited by examiner

FIG. 6

| Frame | Motion feature value | | | |
|---|---|---|---|---|
| | Feature value 1 | Feature value 2 | ... | Feature value K |
| 1 | Not detected | | | |
| 2 | Not detected | | | |
| 3 | 6 | 0 | ... | 0 |
| ... | ... | ... | ... | ... |
| t | 3 | 4 | ... | 1 |
| t+1 | 9 | 3 | ... | 2 |
| ... | ... | ... | ... | ... |

INTERESTING SECTION IDENTIFICATION DEVICE, INTERESTING SECTION IDENTIFICATION METHOD, AND INTERESTING SECTION IDENTIFICATION PROGRAM

TECHNICAL FIELD

The present invention relates to an interesting section identification device that identifies a section that interests a user in a video.

BACKGROUND ART

In recent years, users store, in PCs and the like, many contents including videos and images that the users shot by digital image shooting devices such as digital cameras and video cameras. As the number of the stored contents increases, there occurs a demand for classification of the contents, creation of a digest movie of a video that is one type of the contents, and so on in order for the users to easily recognize the details of the contents.

According to a conventional digest movie creation method, users themselves designate sections to be used for a digest movie from a video, and piece the designated sections together to create a digest movie. However, this method imposes great burdens on the users and requires expert knowledge, and accordingly there is a demand for simplification and automation in creating a digest movie of a video.

In response to this demand, since one possible digest movie that interests users is a video where a dynamic motion occurs, there has been a digest movie creation method of detecting a motion of a person in a video from which a digest movie is to be created, and extracting a section where the person makes the motion (see Patent Literature 1 for example).

CITATION LIST

Patent Literature

[Patent Literature 1] Japanese Patent Application Publication No. 2006-019387

SUMMARY OF INVENTION

However, the above Patent Literature 1 merely provides extraction of a section where a person makes a motion, and does not guarantee extraction of a section that interests users (hereinafter, a section that interest users is referred to as interesting section). This causes a possibility that an appropriate digest movie cannot be created.

The present invention was made in view of the above problem, and aims to provide an interesting section identification device capable of creating a digest movie that interests a user.

In order to solve the above problem, an interesting section identification device relating to the present invention is an interesting section identification device that identifies an interesting section in a video that is estimated to interest a user, the interesting section identification device comprising: an object detection unit configured to detect an object included in a frame extracted from the video; a motion feature value extraction unit configured to calculate a motion feature value of the object in the frame; a distinctiveness calculation unit configured to calculate a degree of distinctiveness in terms of motion of the object with respect to the frame, with use of the calculated motion feature value of the object in the frame; and an interesting section identification unit configured to identify the interesting section in the video, with use of the calculated degree of distinctiveness.

Also, an interesting section identification method relating to the present invention is an interesting section identification method for use in an interesting section identification device that identifies an interesting section in a video that is estimated to interest a user, the interesting section identification method comprising: an object detecting step of detecting an object included in a frame extracted from the video; a motion feature value extracting step of calculating a motion feature value of the object in the frame; a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness.

Also, an interesting section identification program relating to the present invention is an interesting section identification program for causing a computer to perform interesting section identification processing of identifying an interesting section in a video that is estimated to interest a user, the interesting section identification program comprising: an object detecting step of detecting an object included in a frame extracted from the video; a motion feature value extracting step of calculating a motion feature value of the object in the frame; a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness.

With the above structure, the interesting section identification device identifies an interesting section based on a degree of distinctiveness of motion of an object in an extracted frame. Accordingly, it is possible to identify, as an interesting section, a section for example in which motion is the most active among sections in a video. This improves convenience in creating a digest movie that interests a user.

BRIEF DESCRIPTION OF DRAWINGS

FIG. 6 shows an example of a motion feature value of an object in each frame.

DETAILED DESCRIPTION OF INVENTION

<Expertise Achieved by the Present Inventor>

The present inventor considered usage of a motion of an object such as described in the above Patent Literature 1, in order to identify an interesting section that interests users in a video by a device for creating a digest movie. However, the present inventor found that there is a possibility that if an interesting section is identified simply with use of a motion of an object, even a section including a monotonous motion such as a motion of just walking is identified as an interesting section. In the case where the art of the above Patent Literature 1 is used for example, a video where the same operation is repeated is extracted such as a video where a person who is a subject keeps on walking. This results in creation of a digest movie that bores the users.

In view of this, the present inventor considered as to which type of video interests the users as a digest movie, and as a result found that a part where an object makes a distinctive motion often interests the users. The part is for example a part where the object makes a dynamic motion or a part where the object makes a unique motion.

The following describes, with respect to an interesting section identification device invented by the present inventor with originality and ingenuity, a method of calculating a degree of distinctiveness, and identifying an interesting section for creating a digest movie based on the calculated degree of distinctiveness.

<Embodiment 1>

The following describes an interesting section identification device that is one embodiment of the present invention, with reference to the drawings.

<Structure>

Figure 1:
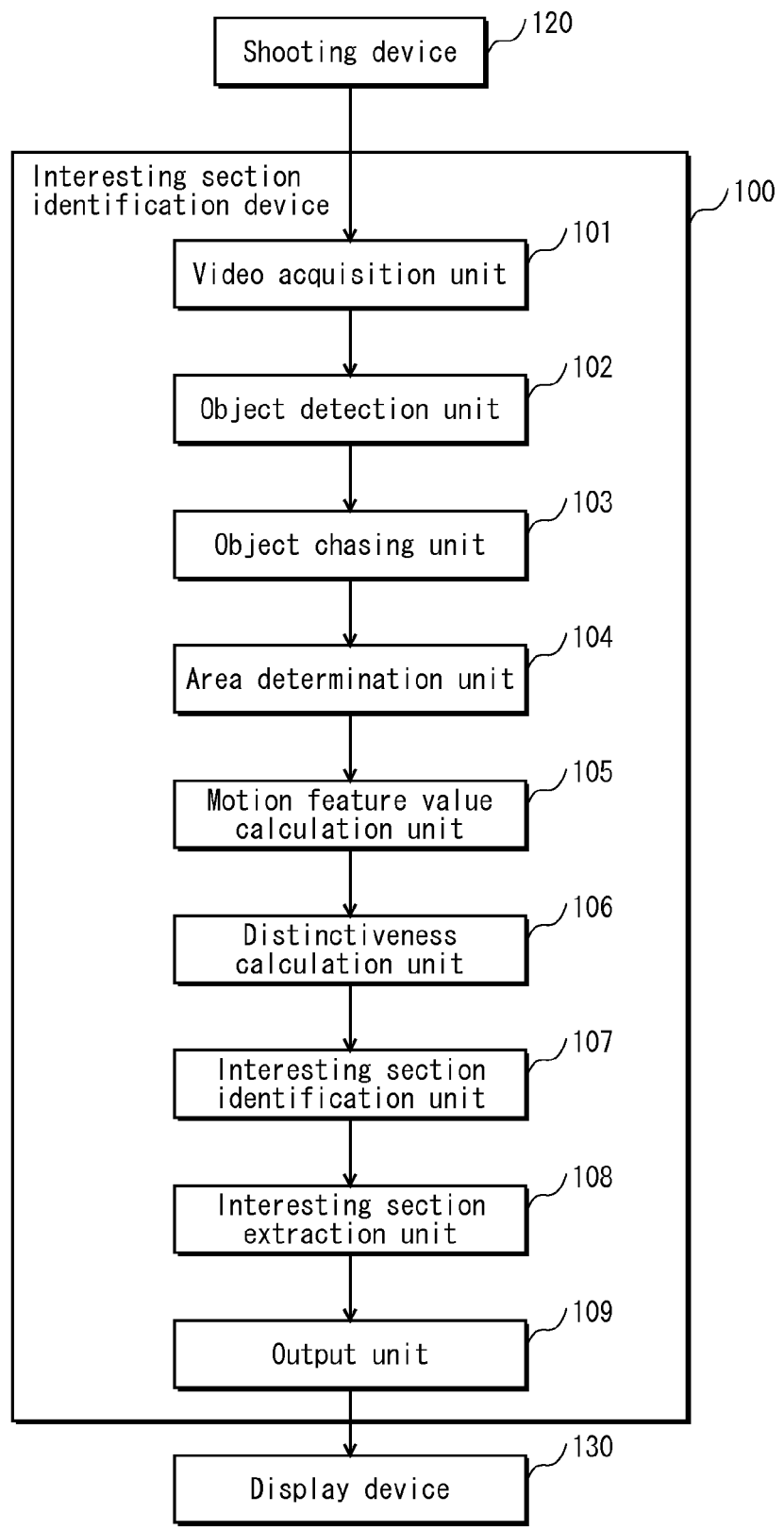
FIG. 1 is a block diagram showing an example of the functional structure of an interesting section identification device.

FIG. 1 is a block diagram showing the functional structure of an interesting section identification device 100. FIG. 1 also shows peripheral devices of the interesting section identification device 100.

As shown in FIG. 1, the interesting section identification device 100 is connected with a shooting device 120 and a display device 130. The interesting section identification device 100 extracts an interesting section from a video shot by the shooting device 120, and causes the display device 130 to display the extracted interesting section. In the present embodiment, an interesting section is a video having a fixed time length (three minutes, for example).

The shooting device 120 is, for example, a device having a function of shooting and recording videos, such as a movie camera and a digital camera. The shooting device 120 is connected with the interesting section identification device 100 via a USB (Universal Serial Bus) cable or the like.

The display device 130 is, for example, a monitor having a function of displaying images, such as a digital TV, an LCD (Liquid Crystal Display), and a PDP (Plasma Display Panel). The display device 130 is connected with the interesting section identification device 100 via a USB cable or the like.

The following describes the structure of the interesting section identification device 100 relating to the present invention.

As shown in FIG. 1, the interesting section identification device 100 includes a video acquisition unit 101, an object detection unit 102, an object chasing unit 103, an area determination unit 104, a motion feature value calculation unit 105, a distinctiveness calculation unit 106, an interesting section identification unit 107, and an interesting section extraction unit 108.

The video acquisition unit 101 has a function of acquiring, from the shooting device 120, videos shot by the shooting device 120. The video acquisition unit 101 is, for example, composed of interface and software for controlling the interface, such as a USB port and a USB driver for connecting the USB cables.

The object detection unit 102 has a function of detecting, from each frame of a video, an object such as a person, a person's face, an animal, and a car.

Figure 2:
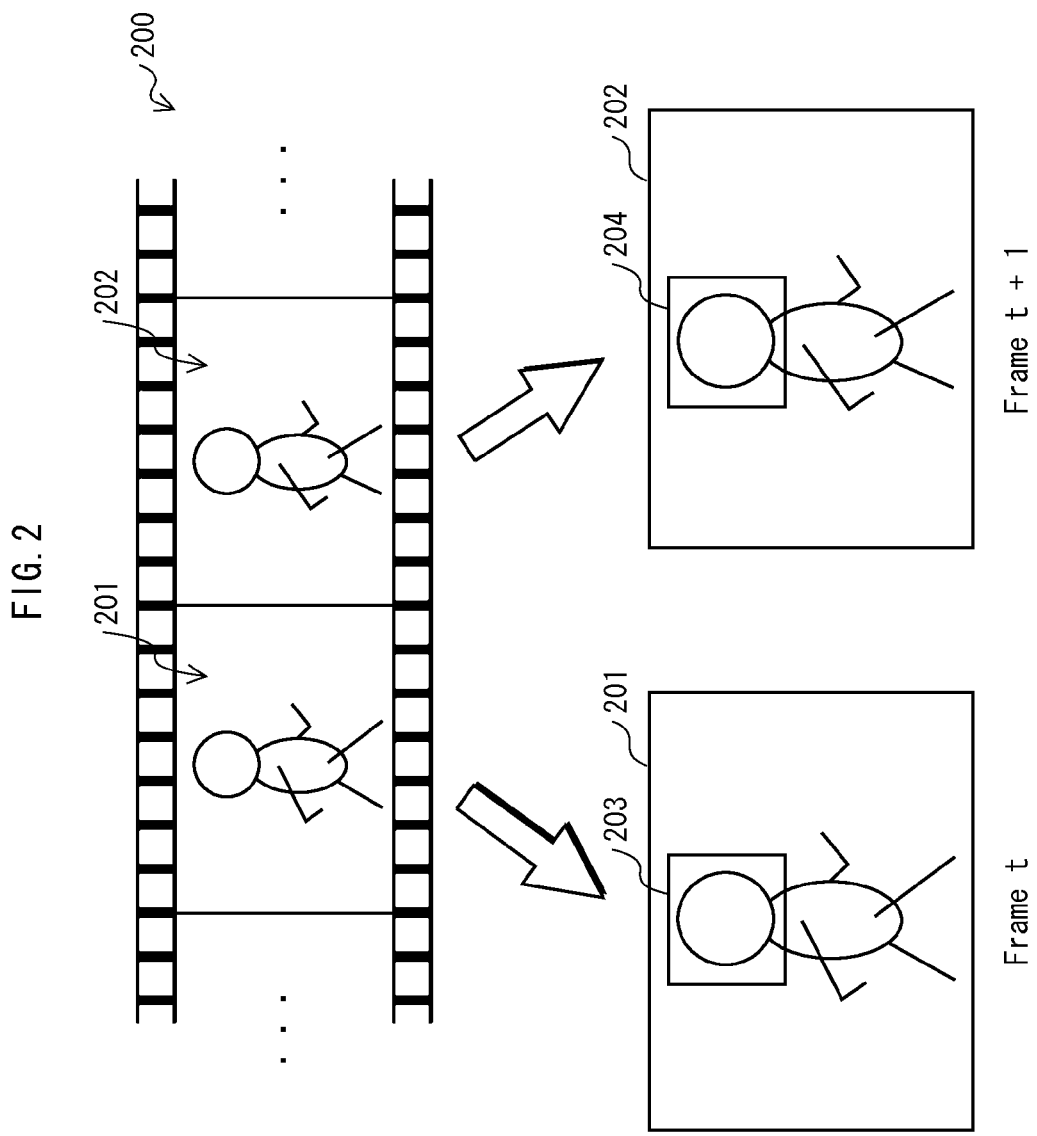
FIG. 2 shows an example of frames of a video and an object extracted from each of the frames.

The object detection unit 102 performs edge detection on each frame, or moves a search window within the frame to identify the object inside the search window using a classifier for identifying objects. As a result, a person's face included in the frame is detected such as shown in FIG. 2 for example. Note that when the classifier is used for detecting a person's face, the classifier is referred to also as a face learning dictionary. As shown in FIG. 2, the object detection unit 102 performs object (face) detection to thereby to detect, from the $t_{th}$ frame 201 and the $t+1_{th}$ frame 202 of a video, objects 203 and 204, respectively. Although the classifier is described here as for detecting person's faces, the classifier may be for detecting animals, cars, and so on other than persons. Also, the object detection unit 102 may include a plurality of classifiers each for detecting a different type of object. Furthermore, the object detection unit 102 may have a function of assigning, to an object detected from a frame, information indicating what type of object a classifier used for detecting the object is to be used for, as metadata.

The object chasing unit 103 chases each object in each frame detected by the object detection unit 102, and judge which position in a subsequent frame the object is. The object chasing unit 103 has a function of assigning the same identifier (object ID) to objects in the frames that are estimated to be the same object as a result of the chasing. One example of object chasing methods is described with reference to FIG. 2. For example, as shown in FIG. 2, areas for the objects 203 and 204 that are detected from the frames 201 and 202 which are successive frames, respectively, are in roughly the same position in the frames 201 and 202. Accordingly, the object chasing unit 103 judges that the objects 203 and 204 are the same object, and assigns the same object ID to the objects 203 and 204. In other words, in the present embodiment, in the case where areas for objects in frames are close to each other, these objects are identified as the same object. In this way, the object chasing unit 103 chases each object in each frame to identify objects included in frames as the same object.

The area determination unit 104 has a function of determining an area on which evaluation of motion of an object is to be made in each frame of a video. The area from which motion of the object is to be detected includes the object to be chased. The following describes area determination performed by the area determination unit 104 with reference to FIG. 3.

Figure 3:
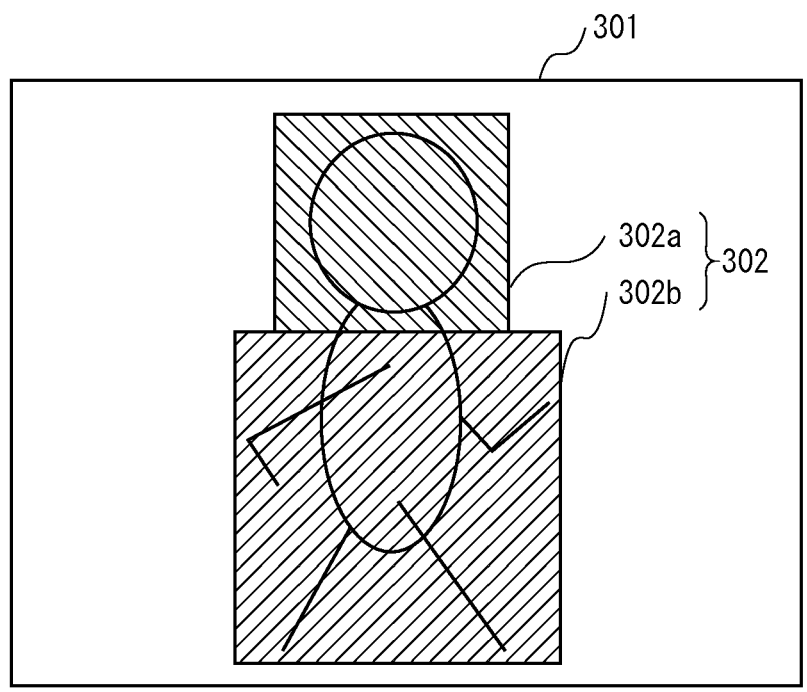
FIG. 3 shows an example of an area on which evaluation of motion of an object is to be made in a frame.

FIG. 3 shows an area that is determined for an object included in a frame 301. In the present embodiment, the area determination unit 104 determines, as an area from which motion of an object is to be detected, an area 302 including an area 302a and an area 302b that are shown by diagonal lines from left to right and diagonal lines from right to left, respectively, in FIG. 3. Specifically, the area 302a includes an object that is estimated to be a person's face detected by the object detection unit 102, and the area 302b is estimated to include a body of the person based on the size of the person's face. The area 302b is determined beforehand to have the direction and the size in accordance with the direction and the size of the area 302a. Note that positions and ranges of areas corresponding between frames may be the same or not depending on combination of each two successive frames. The shape and range of an area determined by the area determination unit 104 are defined in accordance with the type of object detected by the object detection unit 102. Accordingly, the area determination unit 104 determines the shape and range of the area in accordance with the type of object detected by the object detection unit 102.

Figure 4:
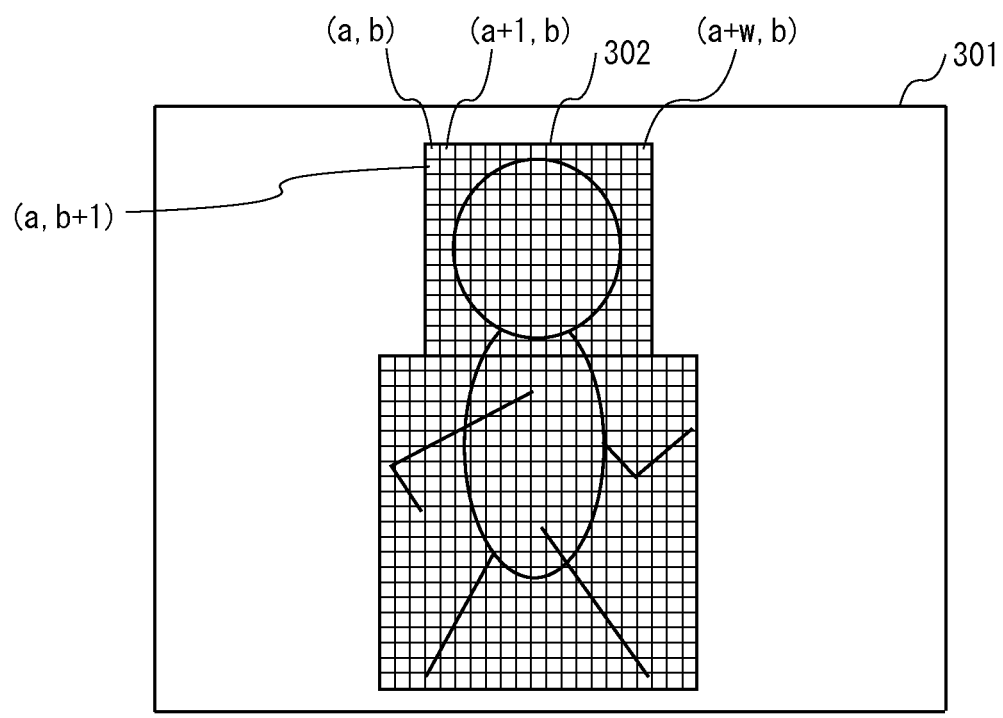
FIG. 4 shows an example of optical flows calculated for the object in the frame.
Figure 5:
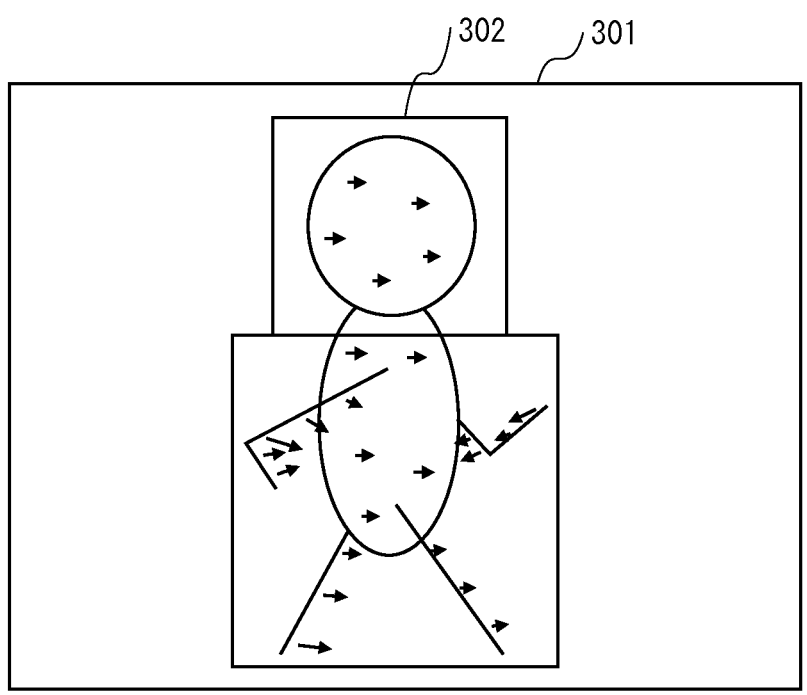
FIG. 5 shows an example of pixels used for evaluating motion of the object in the frame to determine a motion feature value of the object in the frame.

The motion feature value calculation unit 105 has a function of calculating a motion feature value of an object in each frame of a video. The motion feature value calculation unit 105 specifies pixels of an area in the frame of the video determined by the area determination unit 104 (see FIG. 4). FIG. 4 shows pixels of the determined area 302. The motion feature value calculation unit 105 calculates an optical flow of each of the specified pixels (see FIG. 5). FIG. 5 shows an example of only part of optical flows of the pixels of the area. The optical flow is calculated by the gradient method for example. According to the gradient method, under the hypothesis that "luminance of a point on an object does not change after movement", the motion feature value calculation unit 105 estimates a position to which a certain pixel in a frame at a time t will move at time t+1, and calculates a vector based on a move distance of the certain pixel.

Then, the motion feature value calculation unit 105 calculates a motion feature value of the area determined by the area determination unit 104 with use of the calculated optical flows. The following describes one of methods of calculating a motion feature value of an area with reference to FIG. 4.

As shown in FIG. 4, in the area 302, the coordinate (x,y) of a pixel on the extreme left on the first line is (a,b), the coordinate (x,y) of a pixel on the second from the left on the first line is (a+1,b), . . . , the coordinate (x,y) of a pixel on the extreme right on the first line is (a+w,b), the coordinate (x,y) of a pixel on the extreme left on the second line is (a,b+1), . . . . The optical flow of the coordinate (a,b) is calculated as $(x_a, y_b)$, the optical flow of the coordinate (a+1, b) is calculated as $(x_{a+1}, y_b)$, . . . , the optical flow of the coordinate (a+w,b) is calculated as $(x_{a+w}, y_b)$, the optical flow of the coordinate (a,b+1) is calculated as $(x_a, y_{b+1})$, . . . . Then, a motion feature value of the area 302 (feature value 1, feature value 2, feature value 3, . . . , feature value K, . . . ) is calculated as $(x_a, y_b, x_{a+1}, y_b, \ldots, x_{a+w}, y_b, x_a, y_{b+1}, \ldots)$. In other words, the motion feature value of the area 302, which is determined by the area determination unit 104, is a set of optical flows of the pixels of the area 302. Specifically, the set of optical flows is composed of optical flows of pixels arranged from the extreme left to the extreme right on the first line, optical flows of pixels arranged from the extreme left to the extreme right on the second line, . . . , optical flows of pixels arranged from the extreme left to the extreme right on the $N_{th}$ line, . . . , optical flows of pixels arranged from the extreme left to the extreme right on the lowest line. In this way, the motion feature value calculation unit 105 calculates a motion feature value of each object detected from each frame, and stores information indicating the calculated motion feature value in a memory or the like which is not illustrated.

FIG. 6 is a data conceptual diagram showing information indicating stored motion feature values. As shown in FIG. 6, the information indicating the motion feature values shows, for each type of feature value, numerical values of feature values and frame numbers each for identifying a frame in one-to-one correspondence. Here, the type of feature value indicates a motion amount of a motion vector of any pixel of an area in the x-axis direction or the y-axis direction. The information shows, with respect to a frame having a frame number 3, a motion feature value that is composed of a numerical value of six as the feature value 1 and a numerical value of two as the feature value 2.

The distinctiveness calculation unit 106 has a function of calculating a degree of distinctiveness of each frame of a video. The degree of distinctiveness of each frame is an index indicating how much motion of an object in the frame differs from motion of the object in other frame. The method of calculating degrees of distinctiveness is described in detail later.

Figure 7:
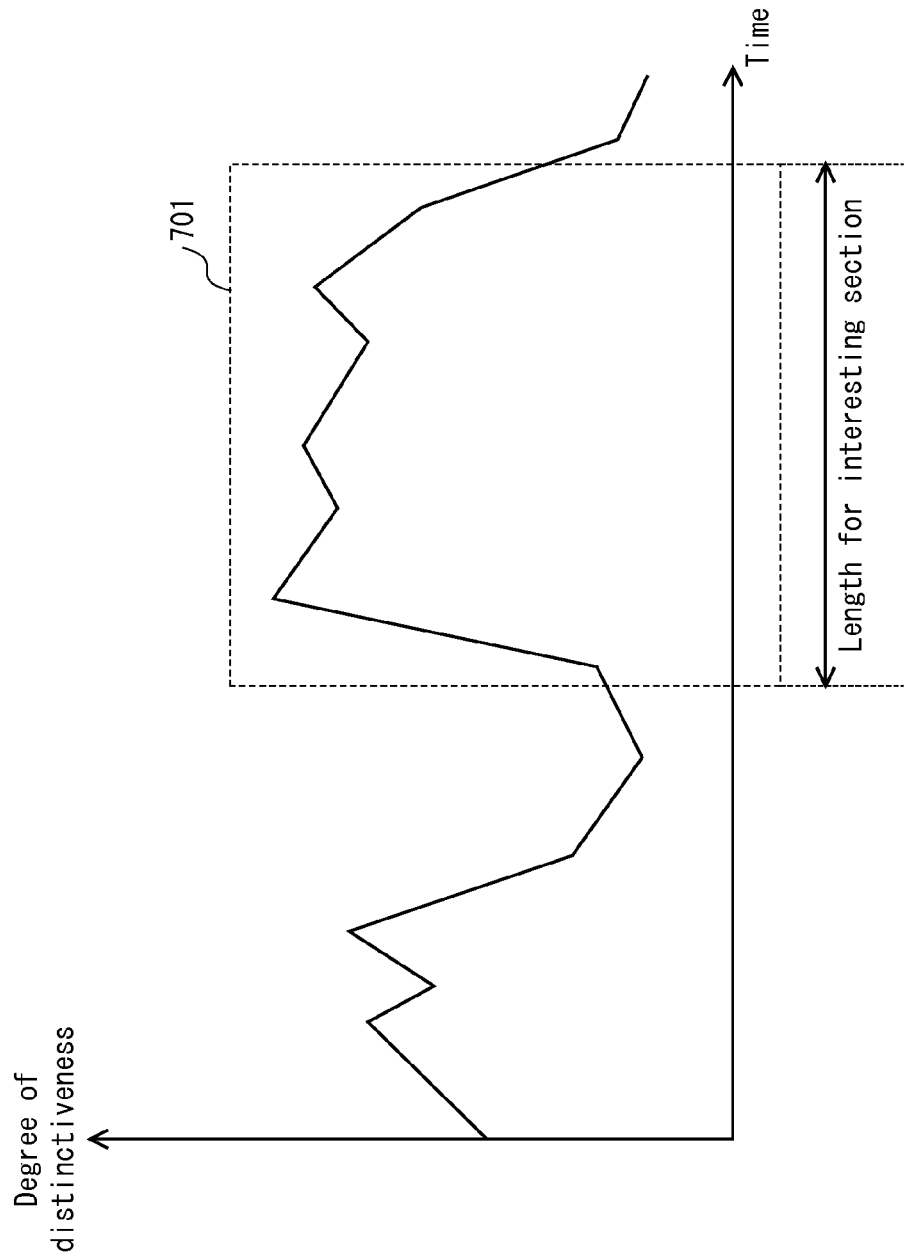
FIG. 7 shows an interesting section identification method.

The interesting section identification unit 107 has a function of identifying an interesting section with use of a degree of distinctiveness of each frame calculated by the distinctiveness calculation unit 106. The following describes a method of identifying an interesting section with reference to FIG. 7. FIG. 7 is a graph showing that a degree of distinctiveness varies over time of a video, with the time on the abscissa and the degree of distinctiveness on the ordinate. The interesting section identification unit 107 shifts a window 701 having a fixed predetermined length from the beginning to the end of the video, and sums up respective degrees of distinctiveness of frames included in each section that is equivalent in length to the window 701. The interesting section identification unit 107 identifies, as an interesting section, a section where the sum of respective degrees of distinctiveness of frames included therein is the highest among the sections that are each equivalent in length to the window 701. Then, the interesting section identification unit 107 assigns, to the video, information indicating the start point and the end point of the identified interesting section. Specifically, the interesting section identification unit 107 indexes, to the video, a tag indicating the start point of the interesting section and a tag indicating the end point of the interesting section (hereinafter, referred to as a start point tag and an end point tag, respectively).

The interesting section extraction unit 108 has a function of extracting, from the video, a movie of the interesting section that has a start point and an end point indicated by the start point tag and the end point tag indexed to the video by the interesting section identification unit 107, respectively.

The output unit 109 has a function of outputting, to the display device 130, the movie of the interesting section extracted by the interesting section extraction unit 108.

The display device 130 plays back the movie of the interesting section output by the output unit 109. By viewing the movie of the interesting section, the user can recognize the details of the video for a short period while viewing the movie of the interesting section with interest.

<Operations>

Figure 8:
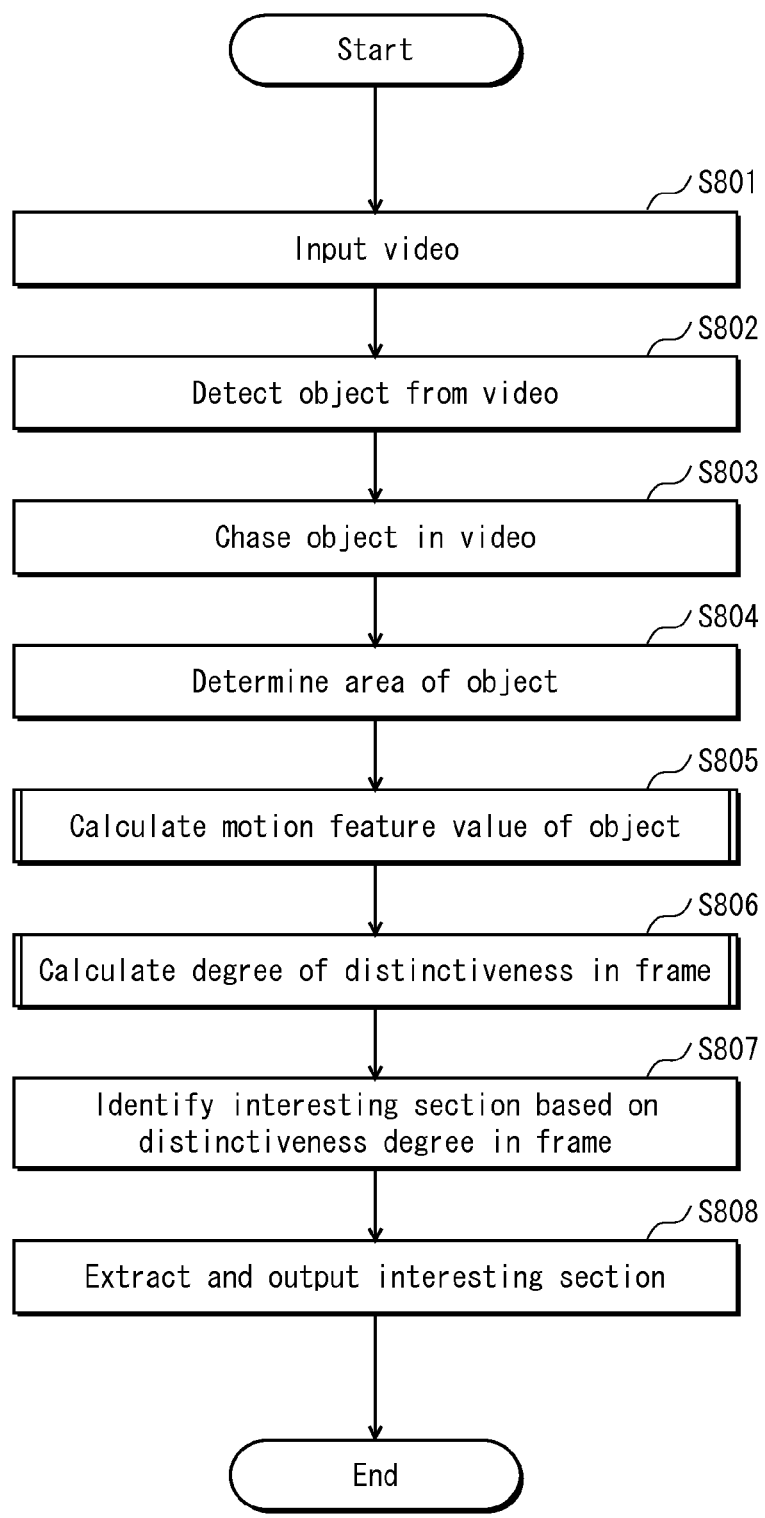
FIG. 8 is a flowchart showing operations performed by the interesting section identification device.

The following describes the operations performed by the interesting section identification device 100 relating to the present embodiment, with reference to the flowchart in FIG. 8.

Firstly, description is given on basic operations of interesting section identification.

The video acquisition unit 101 included in the interesting section identification device 100 acquires a video input by the shooting device 120 via the USB cable (Step S801). The video acquisition unit 101 transmits the acquired video to the object detection unit 102.

The object detection unit 102 detects one or more objects included in each of frames of the video (Step S802). The object detection unit 102 transmits information of each of the detected objects to the object chasing unit 103.

The object chasing unit 103 chases, for each of the objects detected from each of the frames, in which position the object exists in which frame, and identifies an object that is the same between frames by assigning the same object ID to the object (Step S803).

As a result of the chasing performed by the object chasing unit 103, the area determination unit 104 determines an area in each frame from which motion of the object is to be detected (Step S804).

With respect to the area for each object determined by the area determination unit 104, the motion feature value calculation unit 105 calculates a motion feature value based on how much the area moves between the frame and a subsequent frame (Step S805). In other words, the motion feature value calculation unit 105 calculates, as the motion feature value of the frame, a vector that is a set of optical flows of pixels of the area in the frame.

The distinctiveness calculation unit 106 calculates a degree of distinctiveness of the frame with use of the motion feature value of the frame (Step S806). Operations of calculating degrees of distinctiveness of frames are described in detail later with reference to a flowchart in FIG. 10.

Based on the calculated degree of distinctiveness of each frame, the interesting section identification unit 107 identifies, as an interesting section of the video, a section having the predetermined length for interesting section where the sum of respective degrees of distinctiveness of frames included therein is the highest among sections each having the predetermined length in the video. The interesting section identification unit 107 indexes information indicating the start point and the end point of the interesting section to the video (Step S807).

The interesting section extraction unit 108 extracts a movie of the interesting section identified by the interesting section identification unit 107 from the video, and outputs the extracted movie of the interesting section to the output unit 109. Then, the output unit 109 outputs the movie of the interesting section to the display device 130 (Step S808). The display device 130 displays the movie of the interesting section output by the interesting section identification device 100. The user can recognize the details of the video by only checking the movie of the interesting section with no need to view the entire video.

The following describes in detail operations of calculating motion feature values in Step S805 in FIG. 8.

Figure 9:
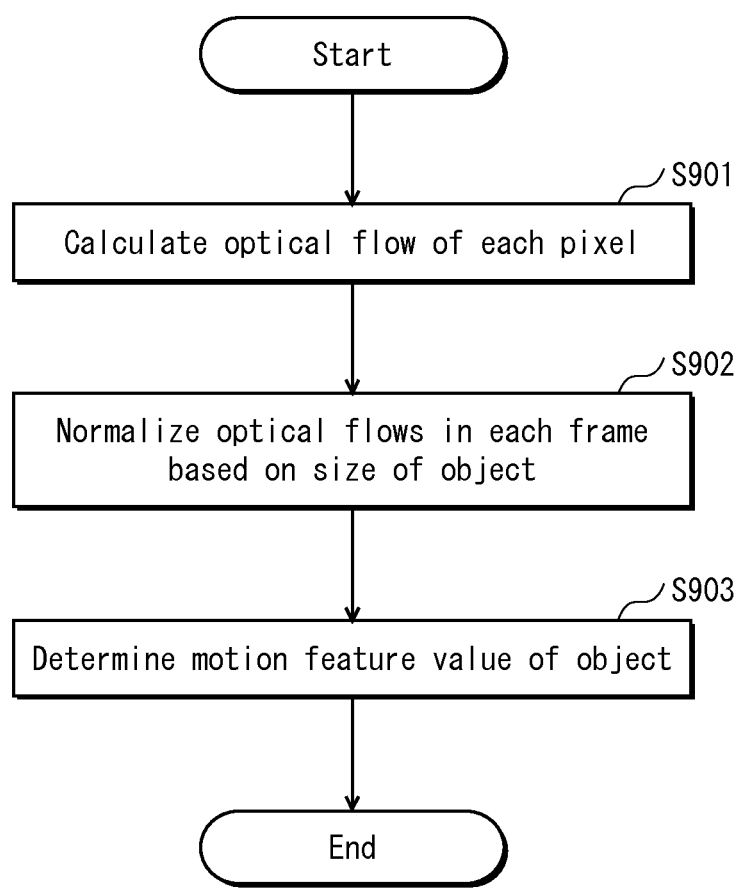
FIG. 9 is a flowchart showing operations of calculating motion feature values.

FIG. 9 is a flowchart showing operations of calculating motion feature values performed by the motion feature value calculation unit 105.

The motion feature value calculation unit 105 calculates an optical flow of each of pixels of the area 302 in each frame (Step S901).

The motion feature value calculation unit 105 normalizes the calculated optical flows in each frame based on the size of an object included in the frame (Step S902). Based on size information of a person's face that is the object, the motion feature value calculation unit 105 for example increases the optical flow of each pixel in size by performing linear interpolation, and decreases the optical flow of each pixel in size by averaging the sizes of optical flows of the pixels of the area before decrease in size. This is because of the following. The size of an object in a video varies depending on the distance between the shooting device 120 and the object that is a subject. In the processing of determining a motion feature value of an object, the size of the object is defined as constant. Therefore, the normalization is performed.

Then, the motion feature value calculation unit 105 calculates a motion feature value represented by a set of optical flows of pixels of an area determined for an object included in each frame (Step S903).

As a result, a motion feature value of each frame is calculated as shown in FIG. 6.

Figure 10:
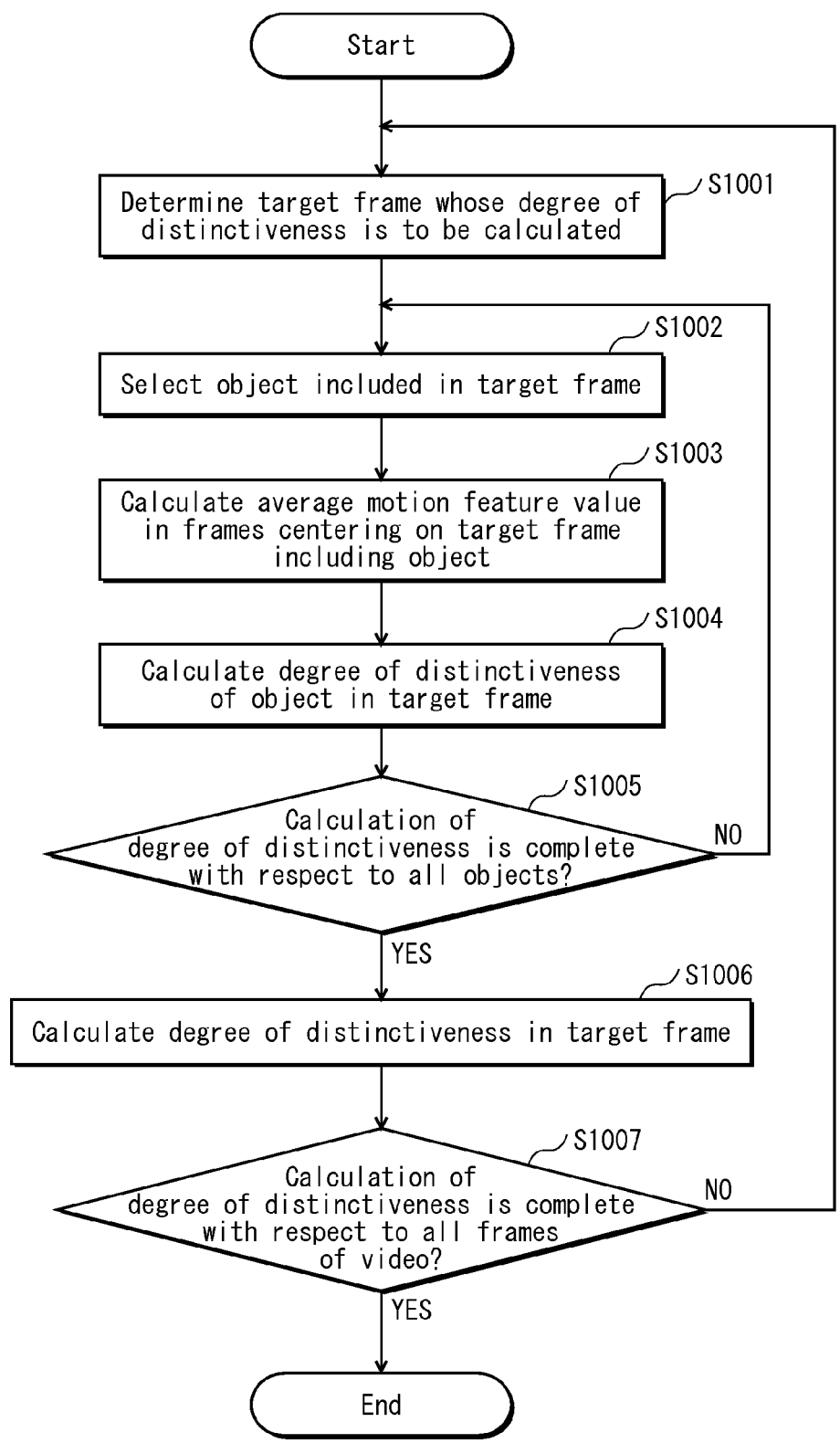
FIG. 10 is a flowchart showing operations of calculating degrees of distinctiveness.
Figure 11:
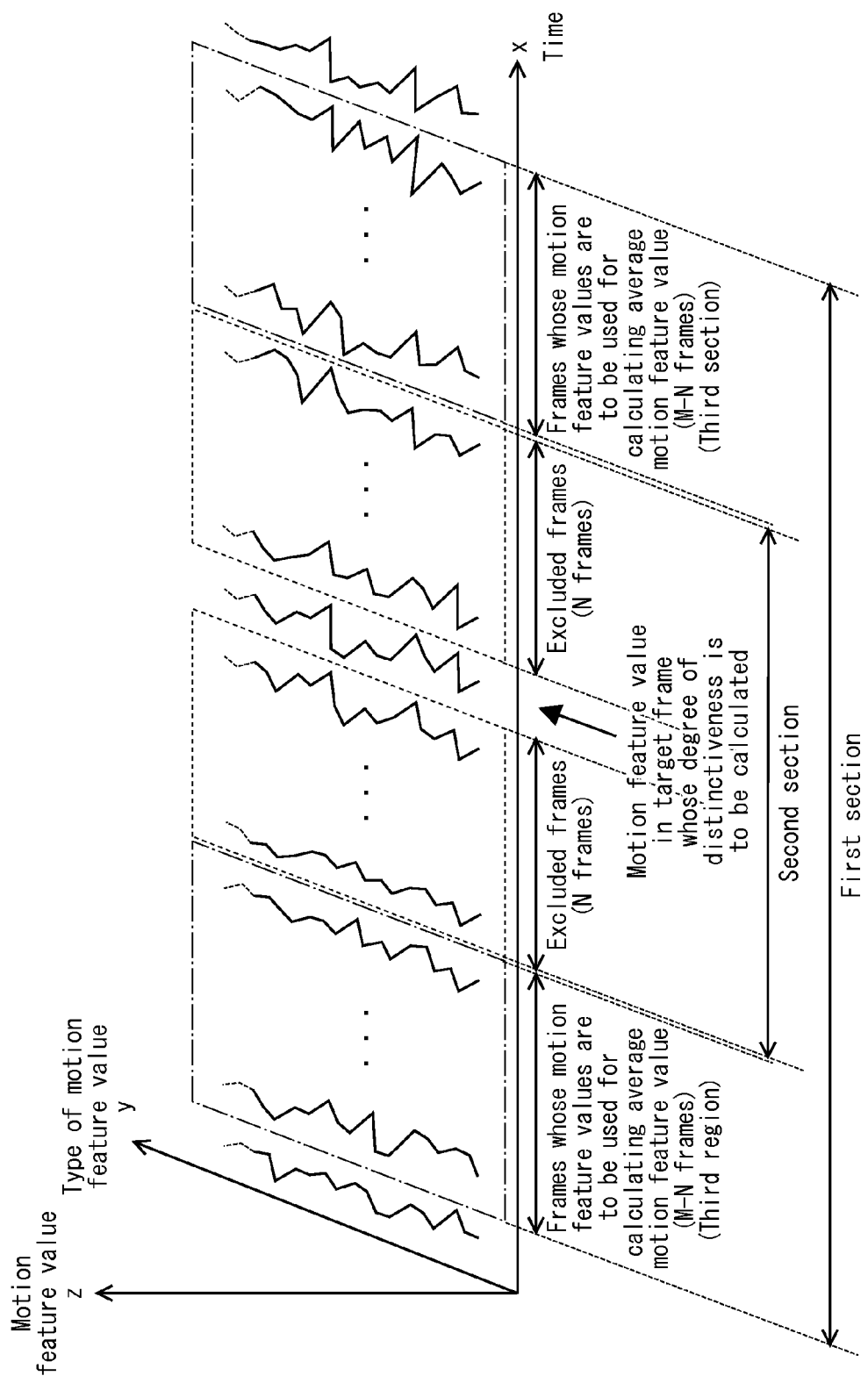
FIG. 11 explains calculation of degrees of distinctiveness of frames.

The following describes in detail operations of calculating degrees of distinctiveness with reference to FIG. 10 and FIG. 11.

FIG. 10 is a flowchart showing operations of calculating degrees of distinctiveness performed by the distinctiveness calculation unit 106. FIG. 11 shows frames for use in calculating a degree of distinctiveness. FIG. 11 is a three-dimensional graph with the time on the x-axis, the type of motion feature value on the y-axis, and the feature value on the z-axis. FIG. 11 shows the concept of a motion feature value of a certain object in each frame of a video in the time axis direction.

Description is given below on a motion feature value for use in calculating a degree of distinctiveness with reference to FIG. 11. A degree of distinctiveness of a target frame indicates how less a motion feature value of the frame is similar to respective motion feature values of frames anterior and posterior to the target frame that fall within a predetermined range. As shown in FIG. 11, a section that includes a target frame, M frames anterior to the target frame, and M frames posterior to the target frame is defined as a first section, where M is an integer equal to or greater than two. Also, a section that includes the target frame, N frames anterior to the target frame, and N frames posterior to the target frame is defined as a second section, where N is an integer equal to or greater than one and less than M. A degree of distinctiveness of the target frame is calculated with use of a motion feature value of the target frame and the average of respective motion feature values of frames included in a third section. The third section results from subtracting the second section from the first section. Note, M frames are 300 frames corresponding to ten seconds of the video, and N frames are 60 frames corresponding to two seconds of the video.

The further detailed description is given below with reference to the flowchart in FIG. 10.

The distinctiveness calculation unit 106 determines a target frame whose degree of distinctiveness is to be calculated (Step S1001). It is only necessary to calculate a degree of distinctiveness of each of all the frames of the video. Accordingly, the target frame may be determined in order from the beginning frame to the end frame of the video, determined in the reverse order from the end frame to the beginning frame of the video, or determined at random. In the operations, distinctiveness calculation starts with the beginning frame of the video.

The distinctiveness calculation unit 106 selects an object included in a target frame (Step S1002).

Next, the distinctiveness calculation unit 106 calculates an average motion feature value that is the average of respective motion feature values of (2M−2N) frames included in a third section based on the target frame including the selected object (Step S1003).

Specifically, a motion feature value of an object A in a target frame k is represented by the following Equation 1.

$$\vec{a}_k \qquad [\text{Equation 1}]$$

An average motion feature value of the object A in the frames included in the third section is represented by the following Equation 2. The frames included in the third section are used for comparison in degree of distinctiveness with the target frame k.

$$\vec{a}_{k,ave} \qquad \text{[Equation 2]}$$

The average motion feature value of the object A in the frames included in the third section is represented by the following Equation 3.

$$\vec{a}_{k,ave} = \frac{\sum_{i=1}^{M-N} \vec{a}_{k-(N+i)} + \sum_{i=1}^{M-N} \vec{a}_{k+(N+i)}}{2(M-N)} \qquad \text{[Equation 3]}$$

Note that when k≤N is satisfied, the average motion feature value of the object A in the frames included in the third section, which is used for calculating the degree of distinctiveness of the target frame k, is represented by the following Equation 4.

$$\vec{a}_{k,ave} = \frac{\sum_{i=1}^{M-N} \vec{a}_{k+(N+i)}}{M-N} \qquad \text{[Equation 4]}$$

Also, when $f_{max}-N \leq k$ is satisfied where $f_{max}$ is the number of all the frames of the video, the average motion feature value of the object A relating to the target frame k is represented by the following Equation 5.

$$\vec{a}_{k,ave} = \frac{\sum_{i=1}^{M-N} \vec{a}_{k-(N+i)}}{M-N} \qquad \text{[Equation 5]}$$

The distinctiveness calculation unit 106 calculates the score (degree of distinctiveness) of the selected object in the target frame k with use of the above Equation 1 and the average motion feature value (Step S1004).

The score of the object A in the target frame k is represented by the following Equation 6.

$$P_k = \frac{|\vec{a}_k|}{1 + \vec{a}_k \cdot \vec{a}_{k,ave}} \qquad \text{[Equation 6]}$$

Specifically, the distinctiveness calculation unit 106 adds one to an inner product of the motion feature value of the object A in the target frame k and the average motion feature value of the object A in the frames included in the third section based on the target frame k. Then, the distinctiveness calculation unit 106 divides the absolute value of the motion feature value of the object A in the target frame k by the sum of the addition, and determines a quotient resulting from the division as the score of the object A in the target frame k.

The distinctiveness calculation unit 106 judges whether score calculation is complete with respect to all the objects included in the selected target frame (Step S1005). When score calculation is not complete with respect to all the objects (Step S1005: NO), the distinctiveness calculation unit 106 returns to Step S1002.

When score calculation is complete with respect to all the objects (Step S1005: YES), the distinctiveness calculation unit 106 sums up the respective calculated degrees of distinctiveness of all the objects to obtain the degree of distinctiveness of the target frame (Step S1006).

Next, the distinctiveness calculation unit 106 judges whether distinctiveness calculation is complete with respect to all the frames (Step S1007). When distinctiveness calculation is not complete with respect to all the frames (Step S1007: NO), the distinctiveness calculation unit 106 returns to Step S1001.

When distinctiveness calculation is complete with respect to all the frames (Step S1007: YES), the distinctiveness calculation unit 106 ends the distinctiveness calculation processing.

The interesting section identification device 100 performs the operations in this way.

With the above structure, the interesting section identification device 100 identifies, as an interesting section, a part of a video where a motion of an object particularly varies, thereby providing the user with an interesting section that keeps the user from getting bored.

<Embodiment 2>

In Embodiment 1, a degree of distinctiveness of a motion of an object in a frame is calculated by comparing with a motion of the object in other frame. The method of calculating the degree of distinctiveness of the object is not limited to this. In Embodiment 2, description is given on a method of calculating the degree of distinctiveness different from that in Embodiment 1. In Embodiment 2, description of the structures that are the same as those in Embodiment 1 is omitted, and difference from Embodiment 1 is described.

Also in Embodiment 2, description is given based on the premise that a plurality of objects are included in a video.

<Structure>

Figure 12:
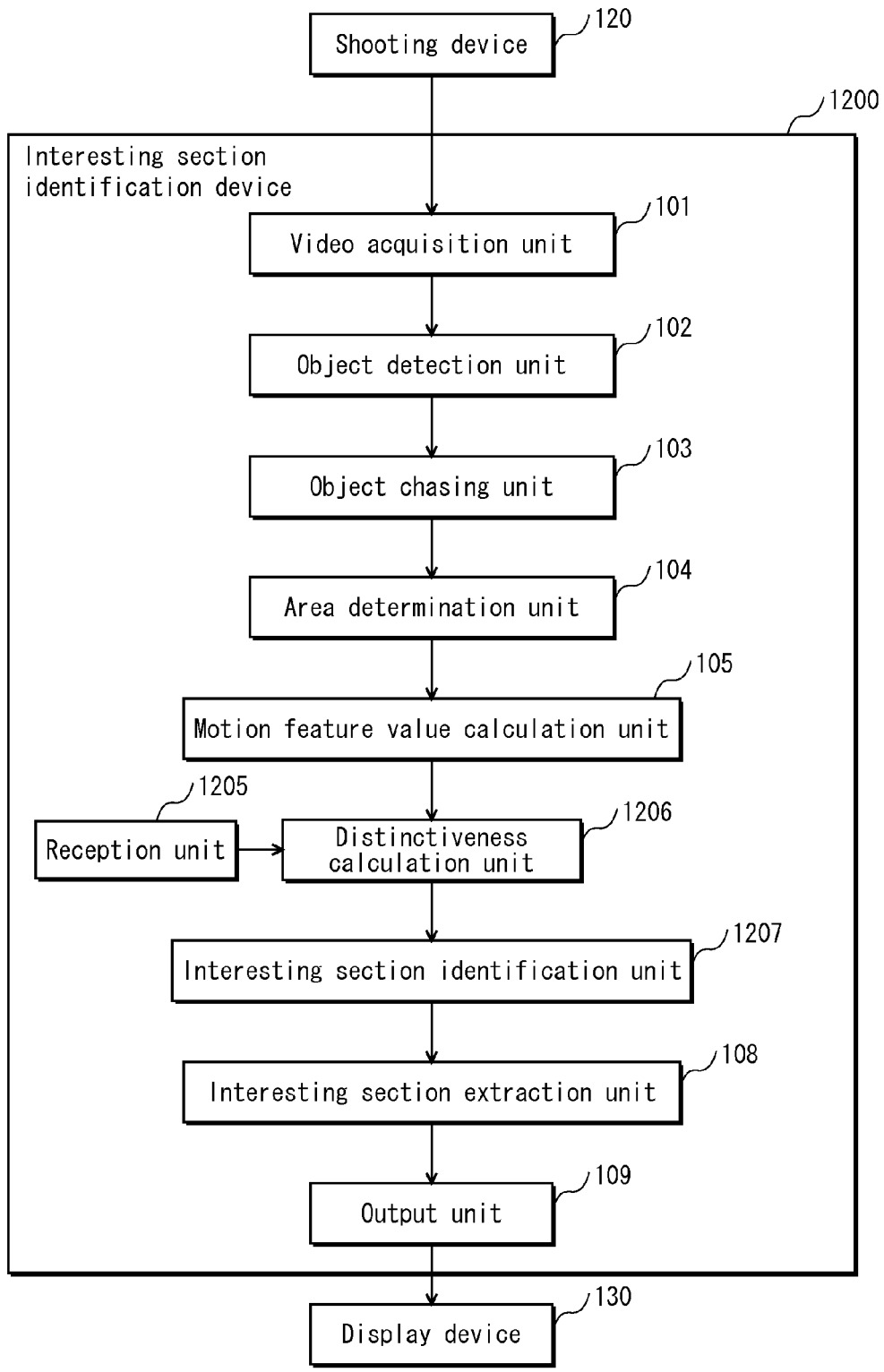
FIG. 12 is a block diagram showing an example of the functional structure of an interesting section identification device relating to Embodiment 2.

An interesting section identification device 1200 relating to Embodiment 2 includes, as shown in FIG. 12, a video acquisition unit 101, an object detection unit 102, a motion feature value calculation unit 105, a distinctiveness calculation unit 1206, an interesting section identification unit 1207, an interesting section extraction unit 108, and an output unit 109. The functional elements shown in FIG. 12 having the same functions as those included in the interesting section identification device 100 shown in FIG. 2 have the same names and reference numerals. Accordingly, description thereof is simplified or omitted.

Information of an object detected by the object detection unit 102 is transmitted to the motion feature value calculation unit 105 via the object chasing unit 103 and the area determination unit 104.

With respect to each frame of a video, the motion feature value calculation unit 105 calculates a motion feature value of each of objects included in the frame detected by the object detection unit 102, and transmits the calculated motion feature value to the distinctiveness calculation unit 1206.

The reception unit 1205 has a function of receiving designation of a certain object selected among the objects detected by the object detection unit 102, and transmitting information of the certain object to the distinctiveness calculation unit 1206.

The distinctiveness calculation unit 1206 has a function of calculating how much the certain object is distinctive from other object included in the same frame.

The distinctiveness calculation unit 1206 selects, among the objects detected by the object detection unit 102, the certain object whose designation is received by the reception unit 1205. The distinctiveness calculation unit 1206 calculates how much a motion feature value of the selected certain object is distinctive from a motion feature value of the other object.

The interesting section identification unit 1207 has a function of identifying an interesting section based on a degree of distinctiveness of a certain object in each frame calculated by the distinctiveness calculation unit 1206. Specifically, the interesting section identification unit 1207 identifies, as an interesting section, a section having a predetermined length where the sum of respective degrees of distinctiveness P of frames included therein calculated by the distinctiveness calculation unit 1206 is the highest among sections each having the predetermined length in the video. The predetermined length is the user's desired length for interesting section, and is for example three minutes or the number of frames corresponding to three minutes.

<Operations>

Figure 13:
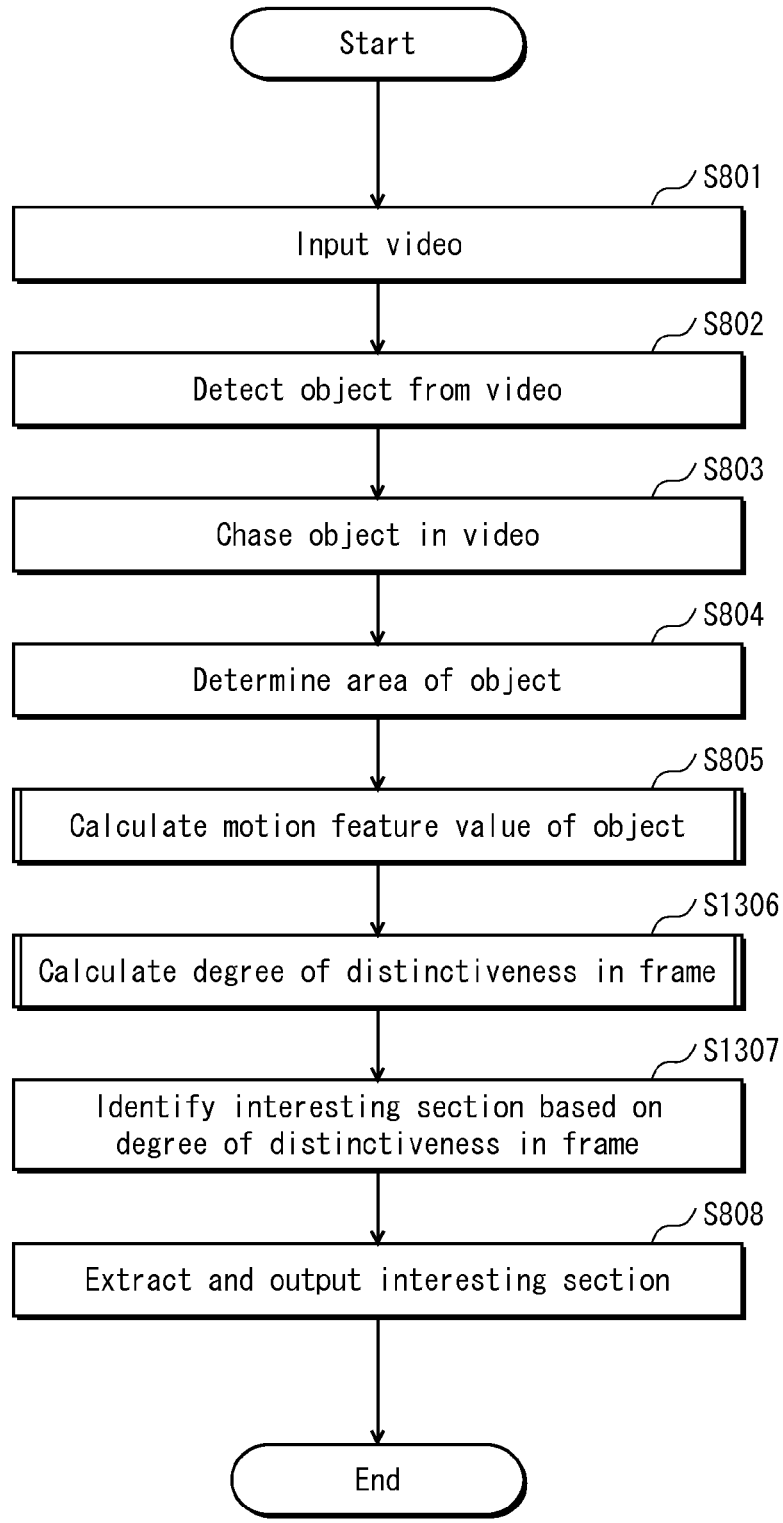
FIG. 13 is a flowchart showing operations performed by the interesting section identification device relating to Embodiment 2.
Figure 14:
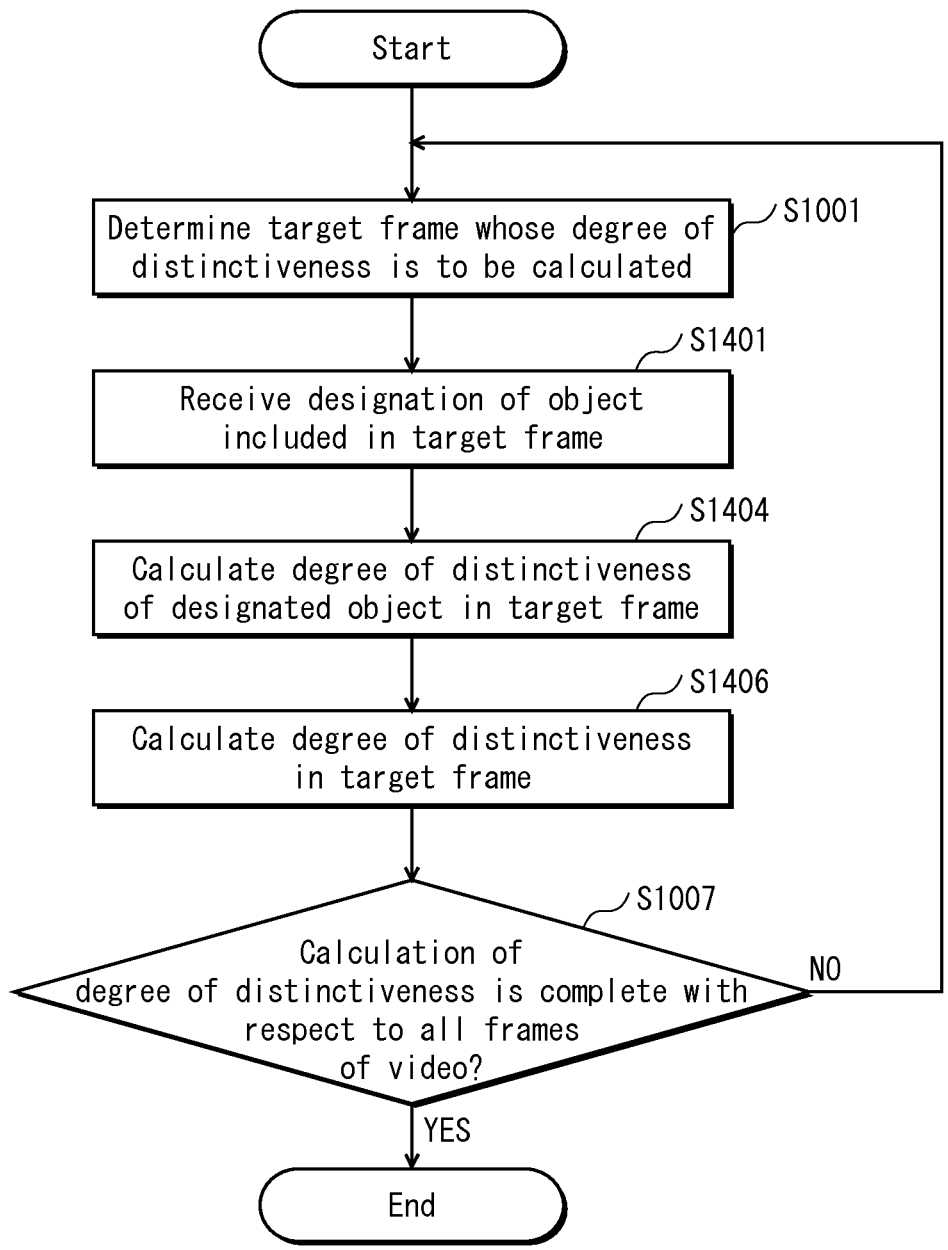
FIG. 14 is a flowchart showing operations of distinctiveness calculation performed by the interesting section identification device relating to Embodiment 2.

The following describes operations of identifying an interesting section performed by the interesting section identification device 1200 relating to Embodiment 2, with reference to flowcharts in FIG. 13 and FIG. 14. In the flowcharts in FIG. 13 and FIG. 14, operations performed by the interesting section identification device 1200 that are the same as those by the interesting section identification device 100 relating to Embodiment 1 shown in flowcharts in FIG. 8 and FIG. 10 have the same reference numerals. Accordingly, description thereof is omitted.

The motion feature value calculation unit 105 included in the interesting section identification device 1200 calculates a motion feature value of each object in each frame of a video (Step S805).

Then, the distinctiveness calculation unit 1206 included in the interesting section identification device 1200 receives the motion feature value of the object in the frame, and calculates a degree of distinctiveness of the object.

The details of a method of calculating a degree of distinctiveness of an object is as shown in the flowchart in FIG. 14.

After a target frame is determined, the reception unit 1205 receives, from the user, designation of a certain object whose degree of distinctiveness is to be calculated (Step S1401).

The distinctiveness calculation unit 1206 calculates the degree of distinctiveness of the certain object in the target frame (Step S1404). Specifically, the distinctiveness calculation unit 1206 calculates the degree of distinctiveness of the designated certain object, with use of the average of respective motion feature values of other objects included in the target frame. Specifically, the degree of distinctiveness of the certain object is calculated as follows.

Firstly, a motion feature value of a certain object in a target frame whose degree of distinctiveness is to be calculated is represented by the following Equation 7.

$$\vec{a}$$ [Equation 7]

Also, a motion feature value of each of one or more objects other than the certain object in the target frame is represented by the following Equation 8.

$$\vec{a}_k$$ [Equation 8]

Note that k is an index for identifying the other object. Here, the index ranges from one to n in the target frame.

An average vector $b_{k,ave}$ of respective motion feature values of the other objects is represented by the following Equation 9.

$$\vec{b}_{k,ave} = \frac{\sum_{k=1}^{n} \vec{b}_k}{n}$$ [Equation 9]

A degree of distinctiveness P of the certain object in the target frame is represented by the following Equation 10.

$$P = \frac{|\vec{a}|}{1 + \vec{a} \cdot \vec{b}_{k,ave}}$$ [Equation 10]

The distinctiveness calculation unit 1206 calculates the degree of distinctiveness P as the degree of distinctiveness of the target frame (Step S1406).

In this way, the distinctiveness calculation unit 1206 calculates the degree of distinctiveness of each frame.

The interesting section identification unit 1207 receives the degree of distinctiveness of each frame from the distinctiveness calculation unit 1206. Then, the interesting section identification unit 1207 identifies, as an interesting section, a section having the predetermined length (equivalent in length to the window 701 shown in FIG. 7) where the sum of respective degrees of distinctiveness of frames included therein is the highest among sections each having the predetermined length in the video.

With this structure, in the case where a video includes a scene of gymnastic formation in an athletic meet for example, the interesting section identification device 1200 is useful in extracting an NG scene where only one student moves differently from other students. In other words, the interesting section identification device 1200 can identify, as an interesting section, a scene where while a plurality of objects make the same motion, only one object makes a different motion.

<Modification Examples>

Although the interesting section identification device relating to the present invention has been described based on the above embodiments, embodiments of the present invention are not limited to the above embodiments. The following describes modification examples that are included as the concept of the present invention.

(1) In the above embodiments, an interesting section identified by the interesting section identification device 100 (1200) has the predetermined length. Alternatively, the interesting section does not necessarily need to have a fixed length.

For example, the interesting section may have a length that accounts for a predetermined rate (for example 10%) of a length of a video from which the interesting section is to be extracted.

Further alternatively, the interesting section identification device 100 (1200) may change a length of an interesting section to be extracted, in accordance with the type of video. The type of video indicates the genre of video such as variety, sports, drama, and news. In this case, the interesting section identification device 100 (1200) stores therein a table with respect to the predetermined length for interesting section in which a length of an interesting section is determined in correspondence with the type of a video. The video acquisition unit 101 identifies the type of a video with use of acquired metadata of the video or the like. The interesting section identification unit 107 (1207) acquires a predetermined length for interesting section corresponding to the identified type of the video to identify an interesting section having the corresponding length. With this structure, the interesting section identification device 100 (1200) identifies an appropriate length of an interesting section in accordance with the type of a video, thereby identifying a more appropriate interesting section. In the case where it is impossible to identify the genre of a video, a user may input the genre of the video to identify a length of an interesting section, or the interesting section of the video may be set to have a predetermined length.

Yet alternatively, the interesting section identification device 100 (1200) may include a setting unit (interface) for enabling the user to set a predetermined length for interesting section. In this case, the interesting section identification unit identifies an interesting section having a predetermined length for interesting section set by the user. The predetermined length for interesting section may be set by the user inputting the number of seconds for the interesting section. Alternatively, the predetermined length may be set by the user making an input on an interface including buttons for setting the predetermined length to long, normal, short, and so on. In this way, an interesting section having the user's desired length may be identified.

(2) In the above embodiments, a first section and a second section, which are used for calculating a degree of distinctiveness of each frame, each have a predetermined length. Alternatively, the first section and the second section each do not necessarily need to have a fixed length.

For example, the interesting section identification device 100 (1200) may determine the respective lengths of the first section and the second section, in accordance with the type of a video. The type of video indicates the genre of video such as variety, sports, drama, and news. In this case, the interesting section identification device 100 (1200) stores therein a table with respect to the respective lengths for first section and second section in which respective lengths of a first section and a second section are determined in correspondence with the type of video. The video acquisition unit 101 identifies the type of a video with use of acquired metadata of the video or the like. The distinctiveness calculation unit 106 (1206) acquires respective lengths for first section and second section corresponding to the type of the video to calculate a degree of distinctiveness. With this structure, the interesting section identification device 100 (1200) identifies respective appropriate lengths of a first section and a second section in accordance with the type of a video, thereby calculating a degree of distinctiveness with a higher precision. In the case where it is impossible to identify the genre of the video, a user may input the genre of the video to identify respective lengths of the first section and the second section, or the first section and the second section may be set to each have a predetermined length.

Yet alternatively, the interesting section identification device 100 (1200) may include a setting unit (interface) for enabling the user to set respective lengths of the first section and the second section. In this case, the distinctiveness calculation unit 106 (1206) calculates a degree of distinctiveness with use of the first section and the second section having the predetermined length for first section and the predetermined length for second section set by the user, respectively.

(3) The distinctiveness calculation method used by the interesting section identification device 100 (1200) described in the above embodiments is just one example. Any other method may be used for distinctiveness calculation as long as it is possible to calculate how much motion of an object in a video is distinctive.

For example, in Embodiment 1, motion feature values of frames included in a second section are not used for calculating a degree of distinctiveness of a target frame. Alternatively, it may be possible to employ the structure in which the second section is set to have a length of zero, and motion feature values of all the frames included in the first section other than the target frame are used for comparison to calculate the degree of distinctiveness of the target frame.

Further alternatively, the numerator in each of the above Equations 6 and 10 may be set to one.

Yet alternatively, weighting may be made on respective calculated degrees of distinctiveness of frames such that a motion feature value of a certain frame included in the frames is reflected highly among motion feature values of the frames used for calculating the degrees of distinctiveness.

Further alternatively, any method other than the method of modifying the above Equations 6 and 10 may be employed. For example, an inner product of the motion feature value of the target frame and the average motion feature value of frames included in the third section may be used with no modification as a degree of distinctiveness of the target frame. The closer to zero the inner product is, the higher the degree of distinctiveness is. The closer to one the inner product is, the lower the degree of distinctiveness is.

(4) In the above embodiments, in the case where a plurality of objects are detected from a video, the interesting section identification device 100 (1200) sums up respective degrees of distinctiveness of the objects in a target frame, with use of respective motion feature values of the objects in the target frame, thereby to obtain a degree of distinctiveness of the target frame. Alternatively, other method may be use for calculating the degree of distinctiveness of the target frame.

Specifically, in the case where the object detection unit 102 detects a plurality of objects from a video, the distinctiveness calculation unit 106 (1206) may weight respective degrees of distinctiveness of the detected objects, and sum up the weighted degrees thereby to obtain a degree of distinctiveness of a target frame.

Assume the following case for example. Three objects A, B, and C are detected from a video, and respective degrees of distinctiveness of the objects A, B, and C in a target frame are calculated as $P_A$, $P_B$, and $P_C$. The interesting section identification device 100 (1200) includes an object specification unit for identifying the type of an object detected by the object detection unit 102 with use of a classifier for identifying a feature of each object. The interesting section identification device 100 (1200) stores therein an object classification table for weighting objects where weighting values are in one-to-one correspondence with types of object such as person, animal, and building. The object classification table shows that the objects A, B, and C have weighting values $W_A$, $W_B$, and $W_C$, respectively. In this case, the distinctiveness calculation unit 106 calculates a degree of distinctiveness of the target frame as $P_A \times W_A + P_B \times W_B + P_C \times W_C$. In this way, the interesting section identification device 100 (1200) may calculate a degree of distinctiveness in accordance with the type of an extracted object, thereby to extract an interesting section.

Further assume that an object A mainly appears in the video, in other words, the video is shot in which a main character is a person represented by the object A. In this case, it is desirable to identify an interesting section such that a degree of distinctiveness of motion of the object A is mainly reflected to a degree of distinctiveness of a target frame.

For this reason, the interesting section identification device 100 (1200) includes the reception unit 1205 in the same way as in Embodiment 2. Assume that the reception unit 1205 receives, from the user, designation of the object A that is a main object in the video. The interesting section identification device 100 (1200) sets the weighting value $W_A$ to 1.5 and other weighting value to 0.5, such that the object A is weighted higher. In this way, the interesting section identification device 100 (1200) can identify an interesting section where a certain object is prioritized. Although the weighting value $W_A$ is set to 1.5 and other weighting value is set to 0.5 here, these values are just examples. The object A only needs to be weighted higher than other object.

Furthermore, the interesting section identification device 100 (1200) may perform weighting as shown below. In the above case, the interesting section identification device 100 (1200) receives designation of the object A from the user. Alternatively, the interesting section identification device 100 (1200) may designate the object A in the following manner.

The interesting section identification device 100 (1200) may include a storage medium storing therein a plurality of videos other than a video from which an interesting section is to be extracted, or have a function of accessing an external storage medium (or a storage medium on the network) storing therein such a plurality of videos.

The interesting section identification device 100 (1200) detects one or more objects from the videos stored in the storage medium. The objects are detected from an arbitrary frame that is extracted from each of the videos. In other words, the objects may be detected from each of all the frames, or may be extracted from one or more frames selected at random. In order to judge whether the detected objects are the same object, the interesting section identification device 100 (1200) clusters each of the objects based on a feature value of the object.

The interesting section identification device 100 (1200) identifies the objects whose degrees of distinctiveness are clustered into the same cluster resulting from clustering as the same object.

The interesting section identification device 100 (1200) judges that an object corresponding to a cluster having the highest number of nodes is an object (subject) that is important for the user. Note that the node is a feature value of the object corresponding to the cluster. The object A described above is identified in this way.

In the above case, the object A is identified as the object corresponding to the cluster having the highest number of nodes. Alternatively, a predetermined number of nodes may be set beforehand as a threshold value. When an object corresponding to a cluster whose number of nodes exceeds this threshold value, a degree of distinctiveness of the object may be weighted. This weighting only needs to be made such that the object corresponding to the cluster whose number of nodes exceeds the threshold value is weighted higher than other object. Also, in the case where there are a plurality of objects corresponding to clusters whose number of nodes exceeds the threshold value, the corresponding objects are each weighted. In this case, a uniform weighting value may be assigned to each of the objects, or a different weighting value in decreasing order of the number of nodes may be multiplied for the object. Alternatively, with respect to each object corresponding to a cluster whose number of nodes exceeds the threshold value, priority allocation may be made on a weighting value and the weighting value may be multiplied. Specifically, the total of weighting values may be predetermined, and with respect to each object corresponding to a cluster whose number of nodes exceeds the threshold value, a weighting value is distributed to the object in accordance with the number of nodes of the cluster.

Also, an object that is a main object in a video often appears in the central part in frames. For this reason, a weighting value may be set to a degree of distinctiveness of each detected object in accordance with judgment results as to whether the object appears in the central part in the frames.

For example, as the central part in the frame, a rectangle range is set whose diagonal lines are (X1,Y1)-(X2,Y2) where X1, X2, Y1, and Y2 satisfy X2>X1 and Y2>Y1, and are coordinate values of pixels in the frame. Judgment is made as to whether each object is inside the central part. A weighting value assigned for an object that is positioned inside the central part is one, and a weighting value assigned to an object that is positioned outside the central part is zero. Here, the object positioned inside the central part only needs to be weighted higher than the object positioned outside the central part, and weighting values are not limited to one and zero. In the case where an object is positioned on both the inside and the outside of the central part, the object is judged to be positioned in one of the inside and the outside of the central part where whose area is occupied by the object larger than the other. The interesting section identification device 100 (1200) may perform weighting in this way.

(5) In the above embodiments, the interesting section identification unit 106 (1206) identifies, as an interesting section, a section having the predetermined length where the sum of respective degrees of distinctiveness of frames included therein is the highest among sections each having the predetermined length in a video. Alternatively, any other method of identifying an interesting section may be employed as long as a section where a motion is distinctive is identified.

For example, with respect to each two successive frames included in each of sections in a video having the predetermined length, the interesting section identification unit 106 (1206) may identify a point where the difference in motion feature value between a frame and a subsequent frame exceeds a predetermined threshold value, and identify a section having the predetermined length where the number of such points is the highest among the sections each having the predetermined length in the video.

Alternatively, the following method may be employed. The interesting section identification unit 106 (1206) calculates the difference in motion feature value between each two successive frames included in each of sections in a video having the predetermined length, and identifies, as an interesting section, a section having the predetermined length where the sum of the differences is the highest among the sections each having the predetermined length in the video.

(6) In the above embodiments, the number of interesting sections to be identified from a video by the interesting section identification device 100 (1200) is one. Alternatively, the number of interesting sections to be identified from the video does not necessarily need to be one.

For example, the interesting section identification device 100 (1200) may identify, as an interesting section, each of a plurality of sections each having the predetermined length where the sum of degrees of respective distinctiveness of frames included therein exceeds a predetermined threshold value. In this case, instead of the sum of the respective degrees of distinctiveness of the frames, the average of the respective degrees of distinctiveness of the frames may be compared with the predetermined threshold value. With this structure, the interesting section identification device 100 (1200) can extract a plurality of interesting sections. In the case where two sections each having the predetermined length that satisfy the above conditions overlap each other, the interesting section identification device 100 (1200) may identify, as an interesting section, a section having a length that exceeds the predetermined length and has the start point and the end point that are coincident with the start point of anterior one of the two overlapping sections and the end point of posterior one of the two overlapping sections, respectively.

Also, in order to identify a plurality of interesting sections, the output unit 109 may output a digest movie resulting from piecing the identified interesting sections together. Creation of the digest movie may be performed by the interesting section extraction unit 108.

This improves convenience of the interesting section identification device 100 (1200).

(7) In the above embodiments, the distinctiveness calculation unit 106 (1206) calculates a degree of distinctiveness of each of all the frames of a video, and the interesting section identification unit 107 (1207) identifies an interesting section based on the respective degrees of distinctiveness of all of the frames. This is just one example. Alternatively, it is unnecessary to calculate the respective degrees of distinctiveness of all the frames as long as an interesting section is identified with a certain degree of accuracy.

For example, the distinctiveness calculation unit 106 (1206) may calculate a degree of distinctiveness of only each of odd-numbered frames or even-numbered frames of a video, or calculate a degree of distinctiveness of only frames selected at random among frames of the video. In other words, the distinctiveness calculation unit 106 (1206) may thin frames of the video for distinctiveness calculation. The interesting section identification unit 107 (1207) may identify an interesting section only with use of frames whose respective degrees of distinctiveness are calculated.

With this structure, it is true that the accuracy of identifying an interesting section deteriorates compared with the case where a degree of distinctiveness is calculated with respect to each of all the frames of the video. However, it is possible to reduce the load of calculation processing performed by the interesting section identification device 100 (1200), and shorten the time period required for identifying the interesting section.

(8) In Embodiment 1, calculation is made as to how much a motion feature value of a target frame is distinctive from a motion feature value of each of frames included in a third section of a video. Alternatively, instead of the frames included in the third section, calculation may be made as to how much the motion feature value of the target frame is distinctive from a motion feature value of each of all the frames of the video excluding the target frame.

(9) In the above embodiments, the object chasing unit 103 chases an object in a certain frame, and judges whether a position of the object in the certain frame and a position of an object in a subsequent frame are close to each other (coordinate position of the object in the frame). If judging that the two positions are close to each other, the object chasing unit 103 identifies the two objects as the same object. Alternatively, other method of identifying an object detected by the object detection unit 102 may be employed. For example, the object chasing unit 103 may chase an object in a certain frame, and calculate a degree of similarity between the object in the certain frame and an object in a subsequent frame. The degree of similarity is for example calculated by calculating a degree of similarity in image feature value between the objects with use of the Gabor filter or the like.

The objects between the frames can be identified as the same object by this method.

(10) In the above embodiments, an area 302 determined by the area determination unit 104 includes an object (face) detected by the object detection unit 102 and a body that should be associated with the detected object (face). Alternatively, the area 302 may be a range that does not include the object (face) and the body. For example, in the case where an object to be detected is a person's face, an area on which evaluation of motion of the object is to be made may be an area including only a face, namely, only the area 302a in FIG. 3. In other words, the area 302 may be a range including only part of an area for the object detected by the object detection unit 102 or a range including the entire area for the detected object such as described in the above embodiments.

(11) In the above embodiments, the interesting section identification unit 107 (1207) sums up respective degrees of distinctiveness of frames included in each section that is equivalent in length to the window 701, and identifies, as an interesting section, a section where the sum of respective degrees of distinctiveness of frames included therein is the highest among sections that are each equivalent in length to the window 701. Alternatively, instead of simply summing up respective degrees of distinctiveness of frames that fall within the window 701, other calculation may be employed.

For example, before summing up the respective degrees of distinctiveness of frames that fall within the window 701, the interesting section identification unit 107 (1207) may weight the degree of distinctiveness of a posterior frame among the frames that fall within the window 701. With this structure, the interesting section identification unit 107 (1207) can easily identify an interesting section including parts where motion of an object varies largely more in the second half than in the first half.

(12) In the above embodiments, in order to calculate a motion feature value of an object based on an area on which evaluation of motion of the object is to be made, the motion feature value calculation unit 105 calculates an optical flow of each of pixels of the area, and obtains information pieces indicating the optical flows as the motion feature value of the object.

Alternatively, the motion feature value calculation unit 105 may calculate an optical flow of each of all the pixels of the entire image, and subtract the average of the calculated optical flows from the optical flows of the pixels of the area. With this structure, it is possible to reduce the influence of optical flows which result from the case where though an object itself makes no motion, a video is panned from side to side. Further alternatively, the motion feature value calculation unit 105 may calculate a difference in luminance between a target frame including an area on which evaluation of motion of an object is to be made and a frame anterior to the target frame, and calculate a difference in luminance between the target frame and a frame posterior to the target frame, to obtain information indicating the calculated differences as a motion feature value of the object. Yet alternatively, the motion feature value calculation unit 105 may estimate a distance between the shooting device 120 and an object based on the size of an area on which evaluation of motion of the object is to be made in each frame, to obtain information indicating the calculated distance as a motion feature value of the object.

Furthermore, a change amount in luminance may be employed as a motion feature value instead of optical flows.

(13) In the above embodiments, the motion feature value in the area 302 is represented by a set of optical flows of pixels arranged from the extreme left to the extreme right on the first line, pixels arranged from the extreme left to the extreme right on the second line, . . . , pixels arranged from the extreme left to the extreme right on the $N_{th}$ line, . . . , pixels arranged from the extreme left to the extreme right on the lowest line. However, the arrangement order of optical flows is not limited to this. Any other arrangement order may be employed as long as the arrangement order of pixels representing a motion feature value of each object in each frame is common. For example, the set of optical flows of pixels of the area 302 may be composed of pixels arranged from the extreme right to the extreme left on the first line, pixels arranged from the extreme right to the extreme left on the second line, . . . , pixels arranged from the extreme right to the extreme left on the lowest line. Alternatively, the set of optical flows of pixels of the area 302 may be composed of pixels arranged from the lowest line to the highest line.

(14) In the above embodiments, the interesting section identification unit 107 (1207) indexes the start point tag and the end point tag to the start point and the end point of an interesting section identified in a video, respectively. Alternatively, in the case where the interesting section is set to have a fixed length, only one of the start point tag and the end point tag may be indexed. In this case, a point that is distant from a point indicated by the one indexed tag by the predetermined length for interesting section is the boundary of the interesting section. Namely, in the case where only the start point tag is indexed, a point that is posterior to a point indicated by the start point tag by the predetermined length is the boundary of the interesting section. Also, in the case where only the end point tag is indexed, a point that is anterior to a point indicated by the start point tag by the predetermined length is the boundary of the interesting section.

(15) Although no description is given in the above embodiments, the interesting section identification device 100 (1200) may include a storage unit for storing therein a video acquired by the video acquisition unit 101, a video to which information indicating the start point and the end point of an interesting section is indexed to a video by the interesting section identification unit 107 (1207), a video extracted by the interesting section extraction unit 108, and so on. The storage unit is, for example, embodied as an HDD (Hard Disc Drive), an SSD (Solid State Drive), a flash memory, or the like.

(16) In the above embodiments, the interesting section identification device 100 (1200) acquires a video from the shooting device 120. Alternatively, a video may be acquired from other devices.

For example, the interesting section identification device 100 may include therein a USB flash memory drive to acquire a video stored in the USB flash memory drive. Alternatively, the interesting section identification device 100 (1200) may have a network communication function to download a video on the Internet.

(17) In the above embodiments, the output unit 109 outputs an extracted movie of an interesting section to the display device 130. An output destination is not limited to the display device 130.

For example, the output unit 109 may output the movie of the interesting section to a USB flash memory connected with the interesting section identification device 100 (1200) for storage, or upload the movie of the extracted interesting section on the Internet.

Also, instead of only the extracted movie of the interesting section, the output unit 109 may output the entire video to which information indicating the start point and the end point of the interesting section is indexed.

(18) In the above embodiments, the interesting section identification device 100 (1200) extracts, as an interesting section, a section where an object makes a large motion. However, there is a possibility that a large motion is detected due to just a scene switching in a video.

In view of this, in the case where variation in motion feature value in a video from which an interesting section is to be extracted is higher by a predetermined threshold value or more, it is judged that scene switching occurs, and the following may be employed. The interesting section identification device 100 (1200) judges that a scene switching occurs in the video, divides the video into two pieces with the boundary of a point where the scene switching occurs, and extracts an interesting section from each or one of the divided two pieces. Also in this case, instead of depending on whether variation in motion feature value is higher by the predetermined threshold value or more, the interesting section identification device 100 (1200) may judge whether the scene switching occurs depending on whether variation in degree of distinctiveness is higher by a predetermined threshold value or more.

(19) In Embodiment 2, the interesting section identification device 1200 receives designation of a certain object included in a target frame, and calculates a degree of distinctiveness of the certain object as a degree of distinctiveness of the target frame.

However, there might be a case where designation of a certain object is not received from the user. In this case, the interesting section identification device 1200 selects a certain object. In other words, instead of the reception unit 1205 for receiving designation of a certain object from the user, the interesting section identification device 1200 may include an object selection unit for selecting an object in accordance with a predetermined algorithm.

Specifically, the following methods are adoptable.

The object detection unit 102 included in the interesting section identification device 1200 detects one or more objects included in each of frames of an input video. Then, the motion feature value calculation unit 105 calculates a motion feature value of each detected object.

The distinctiveness calculation unit 1206 calculates the average of respective motion feature values of all the objects included in each frame. Then, with respect to each frame, the distinctiveness calculation unit 1206 calculates a distance (divergence) between a motion feature value (vector) of each object included in the frame and the calculated average (vector). The distinctiveness calculation unit 1206 identifies an object having the distance that is higher by a predetermined threshold value or more, as an object that makes a distinctive motion in the frame, and selects the object as a certain object.

Then, the distinctiveness calculation unit 1206 may calculate a degree of distinctiveness of the certain object by the method described in Embodiment 2 to specific an interesting section. Note here that any method other than the method described in Embodiment 2 may be used for identifying an interesting section. The distinctiveness calculation unit 1206 may identify, as an interesting section, a section having the predetermined length where the sum of respective distances in frames included therein calculated for selecting a certain object is the highest among sections each having the predetermined length in a video. In this case, the section where the sum of the distances is the highest is identified as an interesting section. Alternatively, the distinctiveness calculation unit 1206 may identify, as an interesting section, a section including a frame where the distance is the highest and predetermined anterior and posterior frames to the frame.

Furthermore, in the same manner as by the method of identifying the object A described in the modification example (4), the object selection unit may select, as a certain object, an object that is frequently included in one or more videos other than a video from which an interesting section is to be identified.

(20) The structures described in the above embodiments and modification examples may be combined with each other.

(21) A control program may be recorded in a recording medium or distributed and made available via any type of communications channel. The control program is composed of program codes for causing an interesting section identification device or a processor of a recording/playback device including such an interesting section identification device such as a DVD player and a BD player and integrated circuits connected with the processor to perform the operations relating to communication, the processing of identifying an interesting section described in the above embodiments (see FIG. 8 to FIG. 10, FIG. 13, and FIG. 14), and so on. The recording medium may be an IC card, a hard disk, an optical disc, a flexible disc, a ROM, or the like. The control program distributed and made available is used by storage in a memory or the like read by the processer such that the execution of the control program by that processor also realizes each of the functions described in the above embodiments.

(22) Specification of an interesting section described in the above embodiments may be realized by requesting other computer and a device such as a cloud server on the network to perform some of the processing performed by the interesting section identification device 100 (1200) described in the above embodiments.

For example, the cloud server may detect an object from a video, instead of the object detection unit 102 included in the interesting section identification device 100 (1200). In this case, the cloud server assigns information of the detected object to the video, and the interesting section identification device 100 (1200) receives the video to which the information is assigned. The interesting section identification device 100 (1200) outputs, to the object chasing unit 103, the video to which the information of the detected object is assigned, so as to cause the object chasing unit 103 to perform subsequent processing.

Alternatively, the interesting section identification device 100 (1200) may request other device to detect a feature value. For example, the object detection unit 102 assigns, to a video from which an object is detected, information of the object. The interesting section identification device 100 (1200) transmits, to a cloud server or the like, the video to which the information of the object is assigned. The cloud server performs the functions of the object chasing unit 103, the area determination unit 104, and the motion feature value calculation unit 105, with use of the video to which the information of the object is assigned. The cloud server assigns, to the video, information of a feature value of each object detected from each frame, and transmits, to the interesting section identification device 100 (1200), the video to which the information of each of the feature values is assigned. Then, the interesting section identification device 100 (1200) performs processing subsequent to the distinctiveness calculation processing.

In this way, the interesting section identification device 100 (1200) may request an external device to perform part of the processing necessary for identifying an interesting section. In this case, the interesting section identification device 100 (1200) and the external device transmit and receive data necessary for the processing to and from each other, as exemplified.

(23) The functional structural elements described in the above embodiments each may be embodied as a circuit for realizing its functions, or may be embodied by one or more processors executing the programs. Also, the interesting section identification device 100 (1200) described in the above embodiments may be structured as a package of an IC, an LSI, or other integrated circuit. This package is incorporated into various types of devices for use. As a result, the devices realize the functions as described in the above embodiments.

The functional blocks are typically embodied as an LSI that is an integrated circuit. Each of the functional blocks may be separately integrated into a single chip, or integrated into a single chip including part or all of the functional blocks. The description is provided on the basis of an LSI here. Alternatively, the name of the integrated circuit may differ according to the degree of integration of the chips. Other integrated circuits include an IC, a system LSI, a super LSI, and an ultra LSI. Furthermore, the method applied for forming integrated circuits is not limited to the LSI, and the present invention may be realized on a dedicated circuit or a general purpose processor. For example, the present invention may be realized on an FPGA (Field Programmable Gate Array) programmable after manufacturing LSIs, or a reconfigurable processor in which connection and settings of a circuit cell inside an LSI are reconfigurable after manufacturing LSIs.

<Supplement>

The following describes embodiments of the interesting section identification device relating to the present invention and effects of the embodiments.

(a) An interesting section identification device relating to the present invention is an interesting section identification device that identifies an interesting section in a video that is estimated to interest a user, the interesting section identification device comprising: an object detection unit configured to detect an object included in a frame extracted from the video; a motion feature value extraction unit configured to calculate a motion feature value of the object in the frame; a distinctiveness calculation unit configured to calculate a degree of distinctiveness in terms of motion of the object with respect to the frame, with use of the calculated motion feature value of the object in the frame; and an interesting section identification unit configured to identify the interesting section in the video, with use of the calculated degree of distinctiveness.

Also, an interesting section identification method relating to the present invention is an interesting section identification method for use in an interesting section identification device that identifies an interesting section in a video that is estimated to interest a user, the interesting section identification method comprising: an object detecting step of detecting an object included in a frame extracted from the video; a motion feature value extracting step of calculating a motion feature value of the object in the frame; a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness.

Also, an interesting section identification program relating to the present invention is an interesting section identification program for causing a computer to perform interesting section identification processing of identifying an interesting section in a video that is estimated to interest a user, the interesting section identification program comprising: an object detecting step of detecting an object included in a frame extracted from the video; a motion feature value extracting step of calculating a motion feature value of the object in the frame; a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness.

With this structure, the interesting section identification device can identify a frame where an object makes a distinctive motion in a video, thereby identifying an interesting section that keeps a user from getting bored. The identified interesting section may be used for creating a digest movie, or may be displayed on a monitor for enabling the user to recognize the details of the video.

(b) According to the interesting section identification device in Item (a), the object detection unit may detect the object from each of a plurality of frames extracted from the video, the motion feature value extraction unit may calculate a motion feature value of the object in each of the frames, and with respect to each of the frames that is a target frame, the distinctiveness calculation unit may calculate a degree of distinctiveness of the motion feature value of the object in the target frame from the respective motion feature values of the object in all other of the frames.

With this structure, in the case where an object makes a distinctive motion in the time axis direction, the interesting section identification device can identify an interesting section including a scene where the object makes the distinctive motion.

(c) According to the interesting section identification device in Item (b), the distinctiveness calculation unit may calculate the degree of distinctiveness of the motion feature value of the object in the target frame, based on an inner product of the motion feature value of the object in the target frame and an average of the respective motion feature values of the object in all other of the frames.

With this structure, the distinctiveness calculation unit calculates the inner product of the motion feature value of the target frame and the average of the respective motion feature values of all other of the frames. Accordingly, the calculated inner product is used as an appropriate index for distinctiveness calculation indicating how less the object in the target frame is similar to the object in the other frames. The closer to zero the inner product is, the less the motion of the object in the target frame is similar to the object in the other frames.

(d) According to the interesting section identification device in Item (c), the distinctiveness calculation unit may calculate the degree of distinctiveness of the motion feature value of the object in the target frame, with use of respective motion feature values of the object in frames included in a first section including the target frame.

With this structure, the interesting section identification device can calculate a degree of distinctiveness of each frame of the video from other frames, and use the calculated degree of distinctiveness as an index for identifying an interesting section. Also, a motion feature value is calculated not with respect to each of all the frames of the entire video but with respect to each of only frames included in the first section. This can reduce the load of calculation processing performed by the interesting section identification device.

(e) According to the interesting section identification device in Item (d), the distinctiveness calculation unit may calculate the degree of distinctiveness of the motion feature value of the object in the target frame with use of an average of respective motion feature values of the object in frames included in a third section, the third section resulting from subtracting, from the first section, a second section that includes the target frame and is shorter than the first section.

With this structure, the interesting section identification device calculates the degree of distinctiveness without using the respective motion feature values of the object in the frames included in the second section other than the target frame, thereby tolerating that an interesting section includes a monotonous motion in the frames included in the second section, because the user does not feel bored just by viewing such a boring motion for only several seconds.

(f) According to the interesting section identification device in Item (e), the distinctiveness calculation unit may determine a length of the second section based on a length of the first section.

The longer the interesting section is, the less the user feels bored even if the interesting section includes some boring motions. With this structure, the interesting section identification device can set the second section having an appropriate length based on the length of the first section.

(g) According to the interesting section identification device in Item (e), the interesting section identification device may further comprise a setting unit configured to enable a user to set the second section.

With this structure, the interesting section identification device can identify an interesting section in accordance with the user's preference.

(h) According to the interesting section identification device in Item (d), the distinctiveness calculation unit may determine a length of the first section based on a length of the video.

With this structure, the interesting section identification device can determine the first section for calculating the degree of distinctiveness based on the length of the video.

(i) According to the interesting section identification device in Item (d), the interesting section identification device may further comprise a setting unit configured to enable a user to set the first section.

With this structure, the interesting section identification device can identify an interesting section in accordance with the user's preference.

(j) According to the interesting section identification device in Item (a), the interesting section identification unit may identify, as the interesting section, a section having a predetermined length where a sum of respective degrees of distinctiveness of the object in frames included therein is the highest among sections each having the predetermined length in the video, with use of respective degrees of distinctiveness of the object in frames extracted from the video.

With this structure, the interesting section identification device identify an interesting section where an object makes a distinctive motion frequently.

(k) According to the interesting section identification device in Item (d), the distinctiveness calculation unit may calculate the degree of distinctiveness of the motion feature value of the object from a motion feature value of other object included in the frame.

With this structure, the interesting section identification device can identify, as an interesting section, a section including a frame where an object makes a motion distinctive from other object in the frame.

(l) According to the interesting section identification device in Item (k), when a plurality of other objects are included in the frame, the distinctiveness calculation unit may calculate the degree of distinctiveness of the motion feature value of the object from an average of respective motion feature values of the other objects included in the frame.

With this structure, when the number of other objects included in the frame is plural, the interesting section identification device can calculate a degree of distinctiveness for use in identifying an interesting section. As a result, the interesting section identification device can identify, as an interesting section, an NG scene where only one person irrelevantly makes a different motion while other persons make the similar motion.

Therefore, the interesting section identification device can identify, as an interesting section, a section where motion is particularly active and a degree of distinctiveness is high.

(m) According to the interesting section identification device in Item (a), the interesting section identification unit may index, to the video, information indicating a start point and end point of the identified interesting section.

With this structure, the interesting section identification device can provide a video including information of an interesting section. Since the information relating to the interesting section is indexed to the video, the interesting section identification device can use the information for designating a playback position (a skip destination) in the video, for example.

(n) According to the interesting section identification device in Item (d), the interesting section identification device may further comprise: an interesting section extraction unit configured to extract, from the video, the interesting section identified by the interesting section identification unit; and a digest creation unit configured to, when the interesting section extraction unit extracts a plurality of interesting sections from the video, create a digest video by piecing the extracted interesting sections together.

With this structure, the interesting section identification device can create a digest movie of the video. Accordingly, the user can easily recognize the details of the video by viewing the created digest movie.

(o) According to the interesting section identification device in Item (a), the interesting section identification device may further comprise: an object position detection unit configured to detect a position where the object is detected in each of frames extracted from the video; and an area determination unit configured to determine an area including the object in each of the frames, the area being on which evaluation of the motion of the object is to be made, wherein the motion feature value extraction unit may calculate the motion feature value of the object in each of the frames, with use of an average of respective motion feature values of feature points in the area.

With this structure, the interesting section identification device determines an area for an object in a frame, and uses motion of the determined area for detecting a degree of distinctiveness of the object. This makes it easy to detect the degree of distinctiveness of the object, compared with the use of motion of the entire frame.

(p) According to the interesting section identification device in Item (a), when the object detection unit detects a plurality of objects from the frame, the distinctiveness calculation unit may calculate the degree of distinctiveness by weighting respective motion feature values of the objects in the frame.

With this structure, the interesting section identification device weights a motion feature value of an object in accordance with the type of the object to calculate a degree of distinctiveness of the object. Accordingly, the interesting section identification device can identify an interesting section that focuses on an object that attracts the user's attention.

(q) According to the interesting section identification device in Item (p), the distinctiveness calculation unit may weight higher an object that is positioned within a certain range in the frame than an object that is positioned outside the certain range in the frame.

Generally, an object that is a main object in a video often appears in the central part in frames. Accordingly, the interesting section identification device for example sets a certain range to the central part in a frame to easily weight an object that is a main object in a video, thereby identifying an interesting section.

(r) According to the interesting section identification device in Item (p), the interesting section identification device may further comprise a reception unit configured to receive designation of a certain object detected from the frame, wherein the distinctiveness calculation unit may weight higher the certain object whose designation is received by the reception unit than other object.

With this structure, the interesting section identification device can weight a designated object. In the case where, for example, the user designates an object that the user estimates to be a main object in a video, the interesting section identification device can weight this designated object to identify an interesting section where the object makes a distinctive motion. As a result, the interesting section identification device identify an interesting section that interests the user.

(s) According to the interesting section identification device in Item (r), the interesting section identification device may further comprise a storage unit configured to store therein one or more other videos, wherein the reception unit may receive, as the designation of the certain object, designation of an object that is frequently included in the other videos.

With this structure, even if receiving designation of no object from the user, the interesting section identification device can select a certain object, and weight the certain object. In the case where the interesting section identification device stores therein a plurality of videos shot by the user, the videos each have a high possibility of including many objects that interest the user. Accordingly, the interesting section identification device can identify that an object that is frequently included in a plurality of other videos is an object that interests the user.

(t) According to the interesting section identification device in Item (a), the motion feature value may be represented by optical flows.

With this structure, optical flows (motion vectors), which are broadly known, are used for representing a motion feature value, thereby increasing the versatility of the interesting section identification device.

The interesting section identification device relating to the present invention is utilizable as a recording/playback device such as a DVD player and a BD player for creating a digest movie of a video.

REFERENCE SIGNS LIST

100 and 1200 interesting section identification device
101 video acquisition unit
102 object detection unit
103 object chasing unit
104 area determination unit
105 motion feature value calculation unit
106 and 1206 distinctiveness calculation unit
107 and 1207 interesting section identification unit
108 interesting section extraction unit
109 output unit
120 shooting device
130 display device
1205 reception unit

The invention claimed is:

1. An interesting section identification device that identifies an interesting section in a video that is estimated to interest a user, the interesting section identification device comprising:
   an object detection unit configured to detect an object included in a frame extracted from the video;
   motion feature value extraction unit configured to calculate a motion feature value of the object in the frame;
   a distinctiveness calculation unit configured to calculate a degree of distinctiveness in terms of motion of the object with respect to the frame, with use of the calculated motion feature value of the object in the frame; and an interesting section identification unit configured to identify the interesting section in the video, with use of the calculated degree of distinctiveness, wherein the object detection unit detects the object from each of a plurality of frames extracted from the video, the motion feature value extraction unit calculates a motion feature value of the object in each of the frames, with respect to each of the frames that is a target frame, the distinctiveness calculation unit calculates a degree of distinctiveness of the motion feature value of the object in the target frame from the respective motion feature values of the object in all other of the frames, and the distinctiveness calculation unit calculates the degree of distinctiveness of the motion feature value of the object in the target frame, based on an inner product of the motion feature value of the object in the target frame and an average of the respective motion feature values of the object in all other of the frames.

2. The interesting section identification device of claim 1, wherein the distinctiveness calculation unit calculates the degree of distinctiveness of the motion feature value of the object in the target frame, with use of respective motion feature values of the object in frames included in a first section including the target frame.

3. The interesting section identification device of claim 2, wherein the distinctiveness calculation unit calculates the degree of distinctiveness of the motion feature value of the object in the target frame with use of an average of respective motion feature values of the object in frames included in a third section, the third section resulting from subtracting, from the first section, a second section that includes the target frame and is shorter than the first section.

4. The interesting section identification device of claim 3, wherein the distinctiveness calculation unit determines a length of the second section based on a length of the first section.

5. The interesting section identification device of claim 3, further comprising a setting unit configured to enable a user to set the second section.

6. The interesting section identification device of claim 2, wherein the distinctiveness calculation unit determines a length of the first section based on a length of the video.

7. The interesting section identification device of claim 2, further comprising a setting unit configured to enable a user to set the first section.

8. The interesting section identification device of claim 1 wherein the interesting section identification unit identifies, as the interesting section, a section having a predetermined length where a sum of respective degrees of distinctiveness of the object in frames included therein is the highest among sections each having the predetermined length in the video, with use of respective degrees of distinctiveness of the object in frames extracted from the video.

9. The interesting section identification device of claim 1, wherein the interesting section identification unit indexes, to the video, information indicating a start point and end point of the identified interesting section.

10. The interesting section identification device of claim 1, further comprising:

an interesting section extraction unit configured to extract, from the video, the interesting section identified by the interesting section identification unit; and a digest creation unit configured to, when the interesting section extraction unit extracts a plurality of interesting sections from the video, create a digest video by piecing the extracted interesting sections together.

11. The interesting section identification device of claim 1, further comprising:

an object position detection unit configured to detect a position where the object is detected in each of frames extracted from the video; and an area determination unit configured to determine an area including the object in each of the frames, the area being on which evaluation of the motion of the object is to be made, wherein the motion feature value extraction unit calculates the motion feature value of the object in each of the frames, with use of an average of respective motion feature values of feature points in the area.

12. The interesting section identification device of claim 1, wherein when the object detection unit detects a plurality of objects from the frame, the distinctiveness calculation unit calculates the degree of distinctiveness by weighting respective motion feature values of the objects in the frame.

13. The interesting section identification device of claim 12, wherein the distinctiveness calculation unit weights higher an object that is positioned within a certain range in the frame than an object that is positioned outside the certain range in the frame.

14. The interesting section identification device of claim 12, further comprising a reception unit configured to receive designation of a certain object detected from the frame, wherein the distinctiveness calculation unit weights higher the certain object whose designation is received by the reception unit than other object.

15. The interesting section identification device of claim 14, further comprising a storage unit configured to store therein one or more other videos, wherein the reception unit receives, as the designation of the certain object, designation of an object that is frequently included in the other videos.

16. The interesting section identification device of claim 1, wherein the motion feature value is represented by optical flows.

17. An interesting section identification device that identifies an interesting section in a video that is estimated to interest a user, the interesting section identification device comprising:

an object detection unit configured to detect an object included in a frame extracted from the video;

a motion feature value extraction unit configured to calculate a motion feature value of the object in the frame;

a distinctiveness calculation unit configured to calculate a degree of distinctiveness in terms of motion of the object with respect to the frame, with use of the calculated motion feature value of the object in the frame; and an interesting section identification unit configured to identify the interesting section in the video, with use of the calculated degree of distinctiveness, wherein the distinctiveness calculation unit calculates the degree of distinctiveness of the motion feature value of the object from a motion feature value of other object included in the frame.

18. The interesting section identification device of claim 17, wherein when a plurality of other objects are included in the frame, the distinctiveness calculation unit calculates the degree of distinctiveness of the motion feature value of the object from an average of respective motion feature values of the other objects included in the frame.

19. An interesting section identification method for use in an interesting section identification device that identifies an interesting section in a video that is estimated to interest a user, the interesting section identification method comprising:

an object detecting step of detecting an object included in a frame extracted from the video;

a motion feature value extracting step of calculating a motion feature value of the object in the frame;

a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness, wherein the object detecting step detects the object from each of a plurality of frames extracted from the video, the motion feature value extracting step calculates a motion feature value of the object in each of the frames, with respect to each of the frames that is a target frame, the distinctiveness calculating step calculates a degree of distinctiveness of the motion feature value of the object in the target frame from the respective motion feature values of the object in all other of the frames, and the distinctiveness calculating step calculates the degree of distinctiveness of the motion feature value of the object in the target frame, based on an inner product of the motion feature value of the object in the target frame and an average of the respective motion feature values of the object in all other of the frames.

20. A non-transitory computer-readable recording medium storing an interesting section identification program for causing a computer to perform interesting section identification processing of identifying an interesting section in a video that is estimated to interest a user, the interesting section identification processing comprising:

an object detecting step of detecting an object included in a frame extracted from the video;

a motion feature value extracting step of calculating a motion feature value of the object in the frame;

a distinctiveness calculating step of calculating a degree of distinctiveness in terms of motion of the object with respect to the frame, with use of the calculated motion feature value of the object in the frame; and an interesting section identifying step of identifying the interesting section in the video, with use of the calculated degree of distinctiveness, wherein the object detecting step detects the object from each of a plurality of frames extracted from the video, the motion feature value extracting step calculates a motion feature value of the object in each of the frames, with respect to each of the frames that is a target frame, the distinctiveness calculating step calculates a degree of distinctiveness of the motion feature value of the object in the target frame from the respective motion feature values of the object in all other of the frames, and the distinctiveness calculating step calculates the degree of distinctiveness of the motion feature value of the object in the target frame, based on an inner product of the motion feature value of the object in the target frame and an average of the respective motion feature values of the object in all other of the frames.

* * * * *